(12) United States Patent
Kah, Jr.

(10) Patent No.: US 9,119,511 B2
(45) Date of Patent: *Sep. 1, 2015

(54) CENTRIFUGAL DIRT SEPARATION CONFIGURATIONS FOR HOUSEHOLD-TYPE AND SHOP-TYPE VACUUM CLEANERS

(76) Inventor: Carl L. C. Kah, Jr., North Palm Beach, FL (US)

( * ) Notice: Subject to any disclaimer, the term of this patent is extended or adjusted under 35 U.S.C. 154(b) by 984 days.

This patent is subject to a terminal disclaimer.

(21) Appl. No.: 13/209,867

(22) Filed: Aug. 15, 2011

(65) Prior Publication Data

US 2011/0296648 A1 Dec. 8, 2011

Related U.S. Application Data

(63) Continuation-in-part of application No. 12/074,438, filed on Mar. 3, 2008, now Pat. No. 7,996,957.

(60) Provisional application No. 60/892,723, filed on Mar. 2, 2007.

(51) Int. Cl.
*A47L 9/16* (2006.01)
*A47L 5/14* (2006.01)
*A47L 9/04* (2006.01)
(Continued)

(52) U.S. Cl.
CPC ............... *A47L 5/14* (2013.01); *A47L 9/0477* (2013.01); *A47L 9/1608* (2013.01); *A47L 9/1641* (2013.01); *A47L 9/1683* (2013.01); *B01D 45/16* (2013.01); *B01D 50/002* (2013.01); *B04C 5/04* (2013.01); *B04C 5/103* (2013.01); *B04C 5/14* (2013.01); *B04C 5/185* (2013.01); *B04C 2009/004* (2013.01); *B04C 2009/005* (2013.01)

(58) Field of Classification Search
CPC ....... A47L 5/14; A47L 9/1608; A47L 9/1683; A47L 9/0477; B01D 50/002; B04C 5/04; B04C 5/103; B04C 5/14; B04C 5/185
USPC ......... 15/347, 351, 352, 353, DIG. 8; 55/337, 55/429, DIG. 3, 343, 345, 428
IPC .................................. A47L 9/10; B01D 46/00
See application file for complete search history.

(56) References Cited

U.S. PATENT DOCUMENTS 6,261,330 B1 7/2001 Dyson
6,398,834 B2 6/2002 Oh
(Continued)

OTHER PUBLICATIONS

International Search Report, Jun. 11, 2012.

*Primary Examiner* — David Redding
(74) *Attorney, Agent, or Firm* — Ostrolenk Faber LLP

(57) ABSTRACT

A cyclonic separation device in accordance with an embodiment of the present application preferably includes a first cyclone chamber having a cylindrical shape with a predetermined diameter, the first cyclone chamber including, a tangential inlet positioned on a first longitudinal end of the first cyclone chamber, a baffle plate positioned in the first cyclone chamber a predetermined distance from the tangential inlet, a tangential dirt outlet positioned on a second end of the cyclone chamber, opposite the inlet and on an opposite side of the baffle plate from the tangential inlet and a center exit duct mounted in the center of the cyclone chamber having an inlet opening positioned upstream from the baffle plate such the centrifuged fluid without particles flows into the center exit duct and out of the cyclone chamber.

4 Claims, 28 Drawing Sheets

(51) Int. Cl.
   *B01D 45/16* (2006.01)
   *B01D 50/00* (2006.01)
   *B04C 5/04* (2006.01)
   *B04C 5/103* (2006.01)
   *B04C 5/14* (2006.01)
   *B04C 5/185* (2006.01)
   *B04C 9/00* (2006.01)

(56) References Cited

U.S. PATENT DOCUMENTS

| | | |
|---|---|---|
| 6,470,597 B1 | 10/2002 | Stipp |
| 6,640,385 B2 | 11/2003 | Oh et al. |
| 6,662,403 B2 | 12/2003 | Oh |
| 6,679,930 B1 * | 1/2004 | An et al. .................. 55/337 |
| 6,746,500 B1 | 6/2004 | Park et al. |
| 6,840,972 B1 | 1/2005 | Kim |
| 7,996,957 B2 * | 8/2011 | Kah, Jr. .................... 15/353 |
| 2002/0029436 A1 * | 3/2002 | Hawkins et al. ........... 15/339 |
| 2004/0177472 A1 | 9/2004 | Go et al. |
| 2006/0037479 A1 | 2/2006 | Song et al. |
| 2007/0143953 A1 * | 6/2007 | Hwang et al. ............. 15/353 |
| 2008/0196745 A1 * | 8/2008 | Conrad ...................... 134/21 |
| 2008/0209667 A1 * | 9/2008 | Allen ......................... 15/346 |
| 2008/0209669 A1 | 9/2008 | Kah |

\* cited by examiner

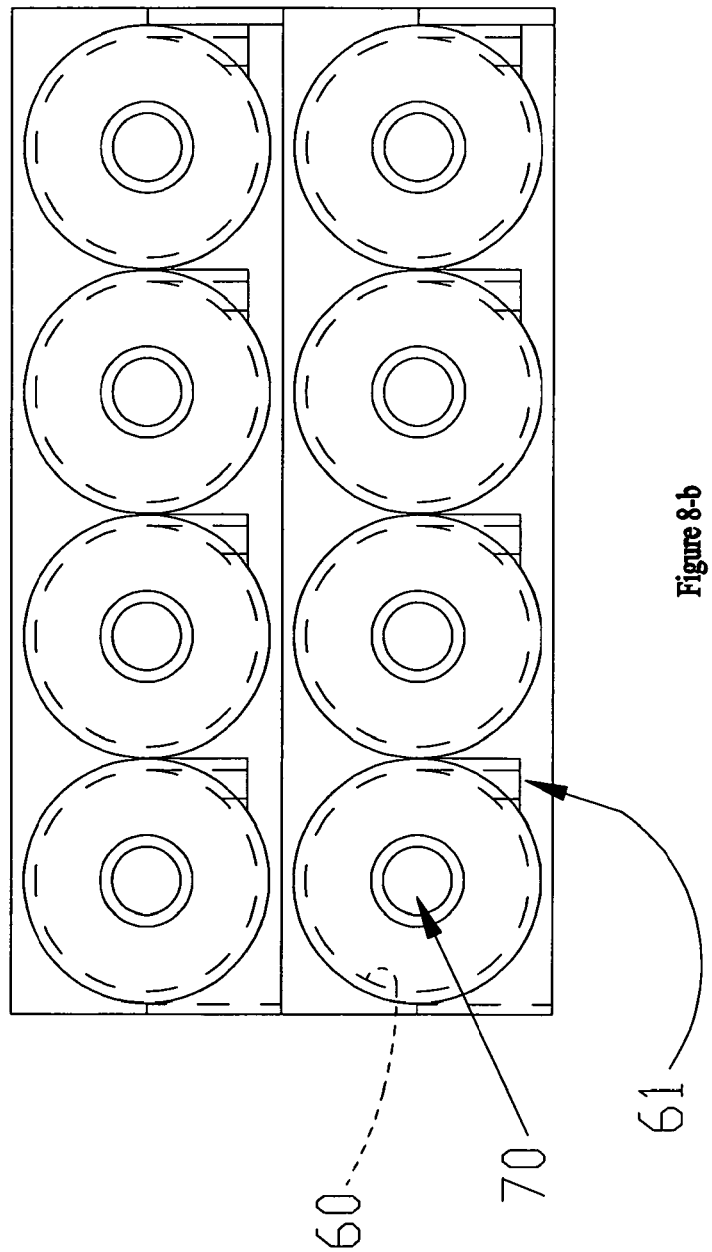
Figure 8-b

CENTRIFUGAL DIRT SEPARATION CONFIGURATIONS FOR HOUSEHOLD-TYPE AND SHOP-TYPE VACUUM CLEANERS

CROSS-REFERENCE TO RELATED APPLICATIONS

The present application is a continuation of U.S. nonprovisional application Ser. No. 12/074,438 filed Mar. 8, 2008 entitled CENTRIFUGAL DIRT SEPARATION CONFIGURATIONS FOR HOUSEHOLD-TYPE AND SHOP-TYPE VACUUM CLEANERS which claims benefit of and priority to U.S. Provisional Patent Application Ser. No. 60/892,723 filed Mar. 2, 2007 entitled CENTRIFUGAL DIRT SEPARATION CONFIGURATIONS FOR HOUSEHOLD-TYPE AND SHOP-TYPE VACUUM CLEANERS, the entire contents of which are hereby incorporated by reference herein.

BACKGROUND

1. Field of the Disclosure

The present application relates to an apparatus for separating dirt or dust particles from an air flow by cyclonic means. The application relates particularly, but not exclusively, to a cyclonic dust separation apparatus for use in a vacuum cleaner.

2. Related Art

Cyclone dust separation devices typically include a frusto-conical (truncated cone) cyclone having a tangential air inlet at the one end having a large diameter and a cone opening leading to a dirt or dust collection area at the other end which has a smaller diameter.

There are numerous patents describing a variety of bagless vacuum cleaners now on the market by manufacturers such as Dyson, Hoover, Bissell; i.e. U.S. Pat. Nos. 5,858,038; 5,062,870; 5,090,976; 5,145,499; 6,261,330 and 5,853,440; English Patent Pub. No. GB727137; and French Patent Pub. No. FR1077243.

U.S. Pat. No. 6,261,330 discloses a device including a fan for causing fluid to flow through the cyclone separator, the cyclone separator having an inlet and an interior wall having a frusto-conical portion tapering away from the inlet, wherein the fan is positioned in the inlet to the cyclone separator chamber on the same axis thereof, such that fluid passing through the fan is accelerated towards the interior wall, and thereby, given sufficient tangential velocity to cause cyclonic separation of particles from the fluid flow within the cyclonic separator chamber. The fan motor is located on the centerline of the cyclone separator chamber, and thus, adds to the size of the cyclone separator chamber.

In U.S. Pat. No. 6,261,330, the inlet port arrangement and the concentric exit port connectors to the cyclone separator are not optimum. The cyclone chamber depends on gravity to keep the dirt in the bottom of the collection chamber, thus requiring the suggested alternate configuration in which the motor is connected to the fan by a long shaft that extends through the cyclone chamber to the fan at the top of the chamber. This position is not ideal for providing suction to lift dirt from the floor. The patent contends that this is an advantageous design because it lowers the center of gravity of the device as a whole when compared to the embodiment shown with the motor at the top of the vertical cyclone separation chamber.

Since many standard vacuum cleaner motors now run at very high RPM's (22,000 RPM, for example) they provide good airflow and vacuum performance with reduced weight. Having a long shaft through the cyclone separator chamber, however, as suggested by the referenced patent, would not be ideal since shaft critical speed vibration problems are likely to result, thus preventing any weight reduction options to improve the desirability of the vacuum cleaner for the public use.

All of the cyclonic separator type vacuum cleaners now on the market have their cyclone separator chamber on the suction side of the fan so that they are driven by the air flow that is being sucked through them. This has the advantage of only clean air being pulled through the fan impeller, but provides much less velocity and energy than would be available by placing the cyclone separation chamber on the discharge side of the vacuum fan.

Accordingly, it would be desirable to provide a cyclonic dust separation device, preferably suitable for use in a home vacuum cleaner that avoids the problems discussed above.

SUMMARY

It is an object of the present invention to provide an apparatus for separating particles from a fluid flow having a cyclone separator which is efficient, compact, lightweight, and easy to service and maintain.

A cyclonic separation device in accordance with an embodiment of the present application preferably includes a first cyclone chamber having a cylindrical shape with a predetermined diameter, the first cyclone chamber including, a tangential inlet positioned on a first longitudinal end of the first cyclone chamber, a baffle plate positioned in the first cyclone chamber a predetermined distance from the tangential inlet, a tangential dirt outlet positioned on a second end of the cyclone chamber, opposite the inlet and on an opposite side of the baffle plate from the tangential inlet and a center exit duct mounted in the center of the cyclone chamber having an inlet opening positioned upstream from the baffle plate such the centrifuged fluid without particles flows into the center exit duct and out of the cyclone chamber.

The cyclonic separation device of the present application may be used in a variety of applications, including, but limited to use in centrifugal separation type vacuum cleaners.

A vacuum cleaner in accordance with an embodiment of the present invention preferably includes a handle and a floor housing to which the handle is pivotally connected. The floor housing preferably includes a suction fan motor, a suction fan driven by the motor and including a plurality of fan blades driven at a high velocity by the suction fan motor to suck a fluid from a first side of the fan to the second side of the fan, a pick up head positioned adjacent to a floor and in fluid communication with the suction fan and a cyclonic separator device. The cyclonic separator device includes a first cyclone chamber having a cylindrical shape with a predetermined diameter, the first cyclone chamber including a tangential inlet positioned on a first longitudinal end of the first cyclone chamber, a baffle plate positioned in the first cyclone chamber a predetermined distance from the tangential inlet, a tangential dirt outlet positioned on a second end of the cyclone chamber, opposite the inlet and on an opposite side of the baffle plate from the tangential inlet; and a center exit duct mounted in the center of the first cyclone chamber having an inlet opening positioned upstream from the baffle plate such the centrifuged fluid without particles flows into the center exit duct and out of the first cyclone chamber, wherein the pick up head and suction fan are connected in fluid communication with the first cyclone chamber such that fluid flows from the pick up head through the tangential inlet into the first cyclone chamber and rotates therein at high velocity such that particles in the fluid are forced out to the inner surface of an outer wall of the first cyclone chamber and beyond the baffle plate to be discharged through the dirt discharge outlet.

A vacuum cleaner in accordance with another embodiment of the present invention preferably includes a handle and a floor housing to which the handle is pivotally attached, The floor housing preferably includes a suction fan motor, a suction fan, driven by the motor, a first cyclone separator connected to an inlet of the suction fan. The first cyclone separator preferably includes a first cyclone chamber having a cylindrical shape with a predetermined diameter, the cyclone chamber including a tangential inlet positioned on a first longitudinal end of the first cyclone chamber, a baffle plate positioned in the chamber a predetermined distance from the tangential inlet, a tangential dirt outlet positioned on a second end of the cyclone chamber, opposite the inlet and downstream of the baffle plate, a center exit duct mounted in the center of the cyclone chamber having an inlet opening positioned downstream from the baffle and in fluid communication with the suction fan inlet such that rotation of the suction fan draws fluid into the first cyclone chamber to rotate at high velocity forcing particles in the fluid past the baffle plate and out of the tangential dirt outlet and a removable dirt collector in fluid communication with the tangential dirt outlet and structured to store the particles discharged from the tangential dirt outlet.

Other features and advantages of the present invention will become apparent from the following description of the invention which refers to the accompanying drawings

BRIEF DESCRIPTION OF THE DRAWING(S)

FIG. 8b is a top view schematic of FIG. 8a.

DETAILED DESCRIPTION OF EMBODIMENTS

The theory of cyclone dirt or dust separation suggests that efficiency can be increased by increasing the tangential velocity of the air in the separation chamber. This would typically suggest providing a more powerful motor to create a higher rate of fluid flow. However, there are limits to the size and weight of motors that the market will tolerate for domestic vacuum chambers, since the size and weight of these chambers naturally influences the size and weight of the resulting domestic home vacuum cleaner as a whole. Increased complexity and size also add to the cost of the vacuum cleaner, which is also an important consideration in the competitive home vacuum cleaner market.

Thus, reducing the size of the motor required to provide a simple high efficiency domestic home vacuum cleaner or shop vacuum cleaner is very desirable. Smaller, lighter weight, more energy efficient vacuum cleaners provide significant advantages in such a competitive market. The vacuum cleaner of the present application allows for a reduction in motor size in that it preferably provides the dirt separation chamber on the output, or blowing, side of the suction fan, which allows the suction fan to impart more speed to the dirt laden air as it is provided to the separation chamber. Thus, higher speed air is provided in the separation chamber without the need to use a larger motor. In addition, the diameter of the separation chamber may also be reduced, which also aids in maintaining high velocity air flow therein and provides better separation while reducing overall vacuum size. These features are described in further detail below.

In the vacuum cleaner 1 (See FIG. 1), for example, of the present application, the design of the fan motor and fan can be separately optimized while maintaining proper motor cooling. Further, the vacuum cleaner of the present application is preferably buildable using existing highly developed domestic vacuum cleaner motors now in production. In addition, the incoming flow to the fan impeller does not have to be compromised and the cyclonic separating chamber can be optimized separately without the need to compromise its design for motor or fan considerations, as is the case in the prior art discussed above.

The design of the present application minimizes the opportunities for flow passage blockage that is a problem in other cyclone dirt separation vacuum cleaners now on the market since all of the air flow elements are preferably close connected with minimum duct work and high velocity air. This reduces the opportunity for velocity and pressure drops as air flows through the cleaner.

Figure 1:
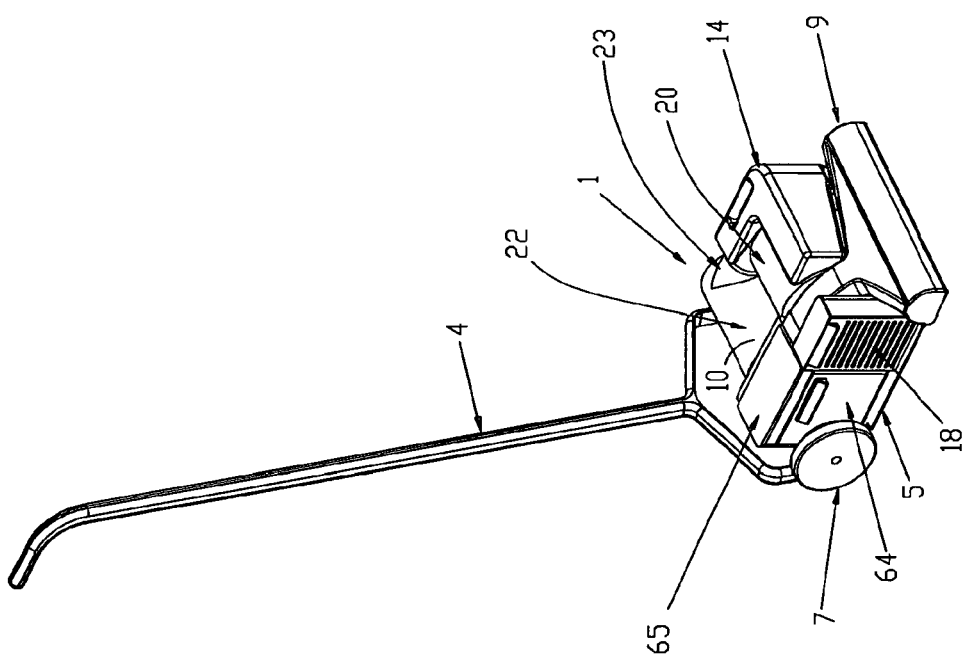
FIG. 1 illustrates an upright floor sweeper vacuum cleaner in accordance with an embodiment of the present application

FIG. 1 illustrates a conceptual perspective view of an upright type vacuum floor cleaner 1 in accordance with an embodiment of the present application. The cleaner 1 includes a handle assembly 4 which can be pivotally mounted to the side of the vacuum cleaner housing assembly 5 which is partially carried by rear wheel assembly 7 and whose pick up head 9 rides in close proximity to a carpet or floor. The head area 9 preferably includes small rollers (not shown) mounted under the housing 5 as well.

The vacuum cleaner suction fan and motor assembly 20 generates suction that is connected to the head area 9 of the vacuum cleaner 1. The suction lifts dirt and dust from the floor and into the vacuum 1. This dirt-laden air then passes through the motor driven fan 6 (See FIG. 4) and is accelerated by the high velocity of the fan rotor blades 8. In a preferred embodiment, the velocity of the blades 8 may be almost the speed of sound (1100 ft/sec) such that the air and dirt is thrown through the tangential input connecting duct 11 to the primary cyclone separator 22. The primary cyclone separator 22 preferably includes a relatively small diameter cyclone chamber 10 (preferably approximately 4 inches in diameter) where the dirt is moved against the outside walls by the very high centrifugal forces and passes the baffled plate 12 (See FIGS. 6 and 7) to be discharged tangentially from the chamber 10 through tangential dirt outlet 23 into a dirt collection bag or container 14.

The dirt free air, however, moves towards the center of the cyclone chamber 10 and exits through a central duct 16 where it can then be finally filtered by filter 18, if desired, or run through a secondary cyclone separator 65 which preferably includes a group of small diameter cyclone chambers 60 which generate very high g-forces due to their smaller diameter.

It is preferred that the air velocity remain high and that the components of the cleaner 1 are closely coupled together to provide for minimum pressure drop between components and to maintain a very open flow design.

Figure 8A:
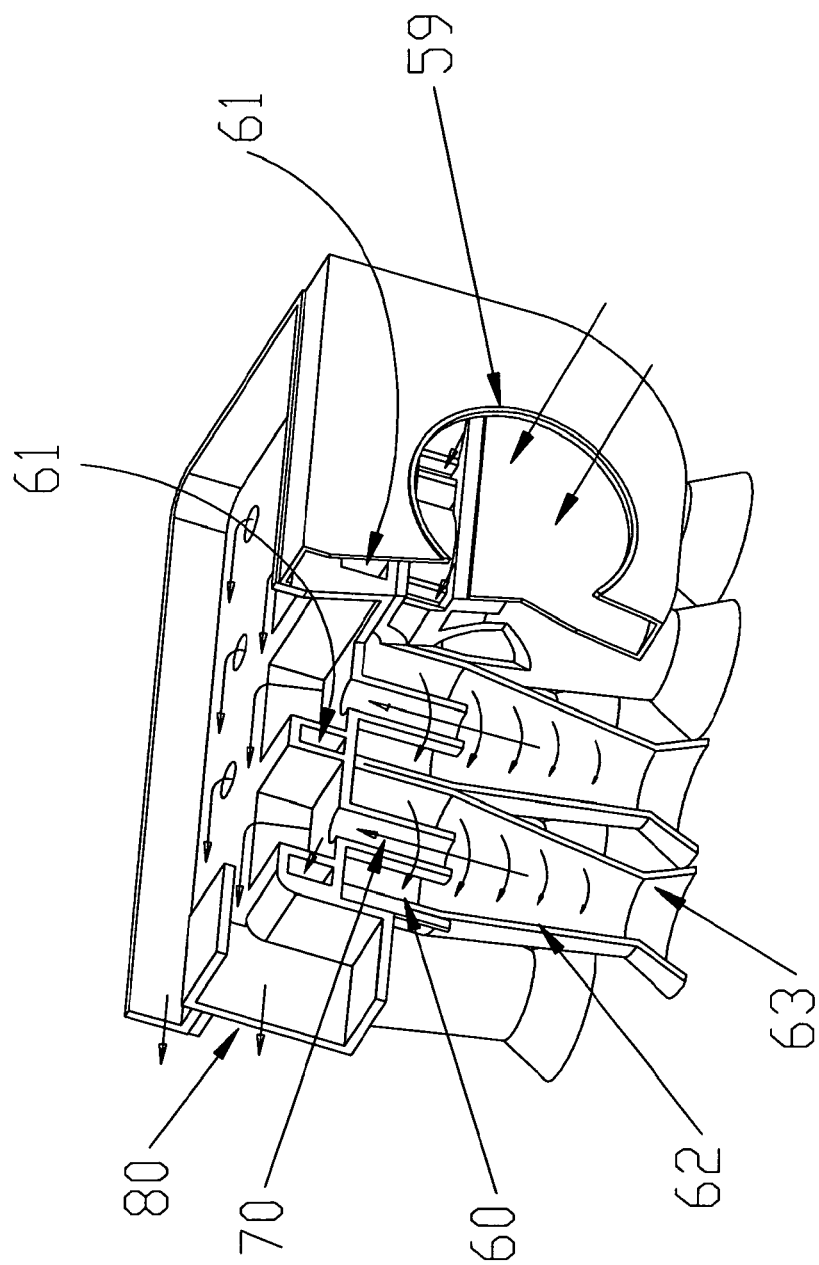
FIG. 8a shows a partial cross sectional perspective flow drawing of a bank of small diameter cyclone separators for a secondary separator for use with the vacuum cleaner of FIG. 1.

The secondary cyclone separator 65 is shown in more detail in FIGS. 8a and 8b, and is preferably embodied as a group of small diameter tangential entry chambers 60 on top of truncated cones 62 that taper to a decreased radius for increasing centrifugal force and including truncated opening 63 at the bottom thereof to provide for dirt discharge into a separate, very fine dirt collection chamber 64. This chamber 64 can also be separately cleaned less often than the larger dirt collection chamber 14. The dirt exit, or openings 63 of each of the small truncated cones 62 can have a reverse cone shape to spread the spinning dirt outwardly and allow more separation between the discarded dirt and the returning air circulation at this location. Air preferably enters the chambers 60 via the inlets 61

The primary, first, cyclone chamber 10 removes all of the larger dirt and a large part of the smaller dirt because of its high velocity, before the air is discharged into these small diameter chambers 60 through connecting duct openings which allow them to operate at maximum efficiency. Thus, the primary cyclone chamber 10 effectively deals with the larger, more voluminous dirt by discharging it into a large collection container 14 which can be several times the capacity of the low efficiency cyclone first stage chamber of bagless vacuum cleaners now on the market since they have to capture the large dirt in the lower part of their cyclone chamber and provide sufficient space to accommodate dirt storage and cyclonic separation. In contrast, in the cleaner 1, for example, of the present application, the dirt is discharged tangentially from the primary cyclone chamber into a separate container for dirt storage. Thus, the size of the primary cyclone chamber is reduced and this provides improved efficiency. Dirt storage can be increased as well, since a separate chamber is provided for the separated dirt, this chamber can be rather large which allows the chamber to be emptied less often. It is noted that the dirt collection chamber 14 is preferably removably attached to the cleaner 1 to allow it to be easily removed and emptied.

The secondary cyclone section 65 has high efficiency and includes a plurality of small diameter cyclone chambers 60 which are left to function in their optimum condition with comparatively clean air, i.e. air only including particles with a diameter of 50 microns.

Figure 9:
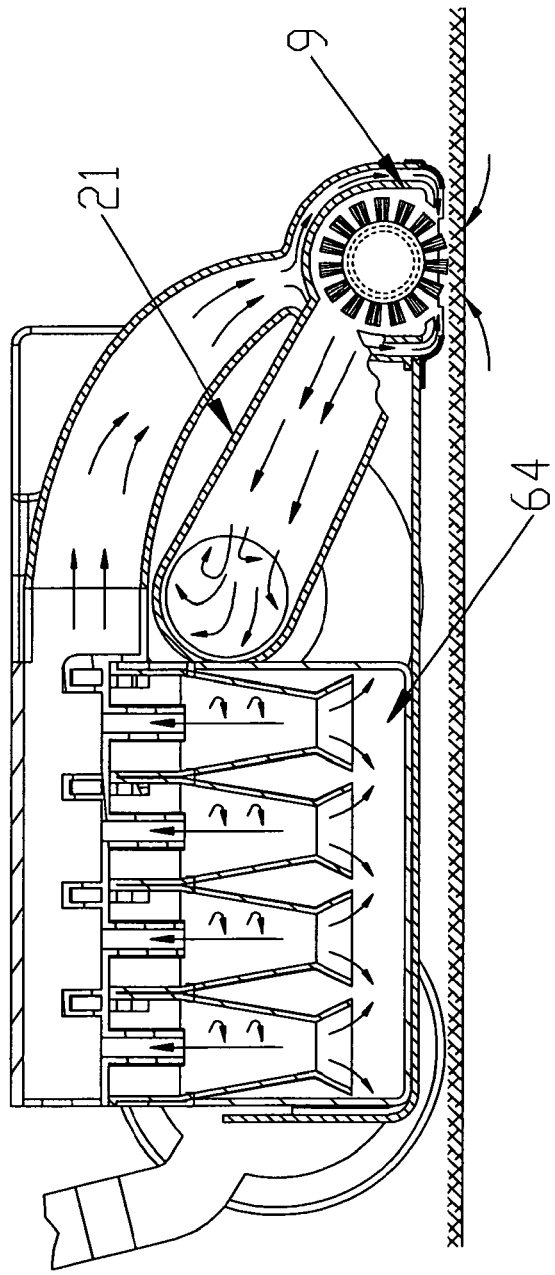
FIG. 9 shows a cross section of a floor sweeper upright type vacuum including the secondary separator of FIG. 8.

The air can then be withdrawn centrally from each of the second stage high efficiency cyclones chambers 60 via the ducts 70 and exhausted, if desired, through exit duct 80 to HEPA filter 18, if desired. However some, or most of this air may alternatively be returned to the vacuum pick up head 9 through the opening 13 to provide jet assisted suction at the pick up area (FIG. 9). The opening 13 is preferably positioned to discharge the returned air substantially parallel to the floor, creating an area of low pressure just above the floor due to the high velocity of the returned air. This area of low pressure (i.e. Bernoulli pressure) aids in suction at the pick up head 9. The return air is in turn sucked back into the vacuum 1 again where the cycle is repeated. In this manner, the air sucked into the cleaner 1 can be recycled to aid in further suction and separation.

The primary cyclone separation chamber 10 provided in the cleaner 1 of the present application preferably has a relatively small diameter (4 inches, for example) which is quite small when compared to that required when the dirt is being separated on the suction side of the vacuum fan, as in the prior art discussed above. This allows for a much more compact, lighter weight and lower manufacturing cost vacuum cleaner. Also, the configuration of the cleaner 1 ensures that the dirt is not captured at the bottom of the primary cyclone chamber, but is discharged tangentially into a bag or dirt compartment 14 separated from the cyclone chamber 10. This, as previously stated, also allows for a reduction of the size of the cyclone separation chamber and more versatility to allow the cyclone dirt separation chamber to be used in a variety of vacuum cleaners configurations including shop vacuums or canister type vacuums, as well as carpet sweeper uprights such as that illustrated in FIG. 1.

The vacuum cleaner design of the present application also has many advantages over prior art vacuum cleaners that use disposable porous bags which must be purchased separately and require frequent replacement. These bag-type vacuums lose effectiveness as the filter bags becoming full and fine particles become trapped by the filter bag to degrade its permeability and cause a loss of suction. While vacuum cleaners using cyclonic separation chambers are known in the art and avoid the problems of replaceable bag cleaners discussed above, these cyclone separation vacuum cleaners are very large, since they must accommodate the larger separation chambers necessary to provide separation and dirt storage.

One of the important features of the vacuum cleaner described herein is to provide for open air flow and to separate the dirt from the air by intense centrifugal force cyclone action such that filtration is only a final back-up if necessary at all.

Figure 4:
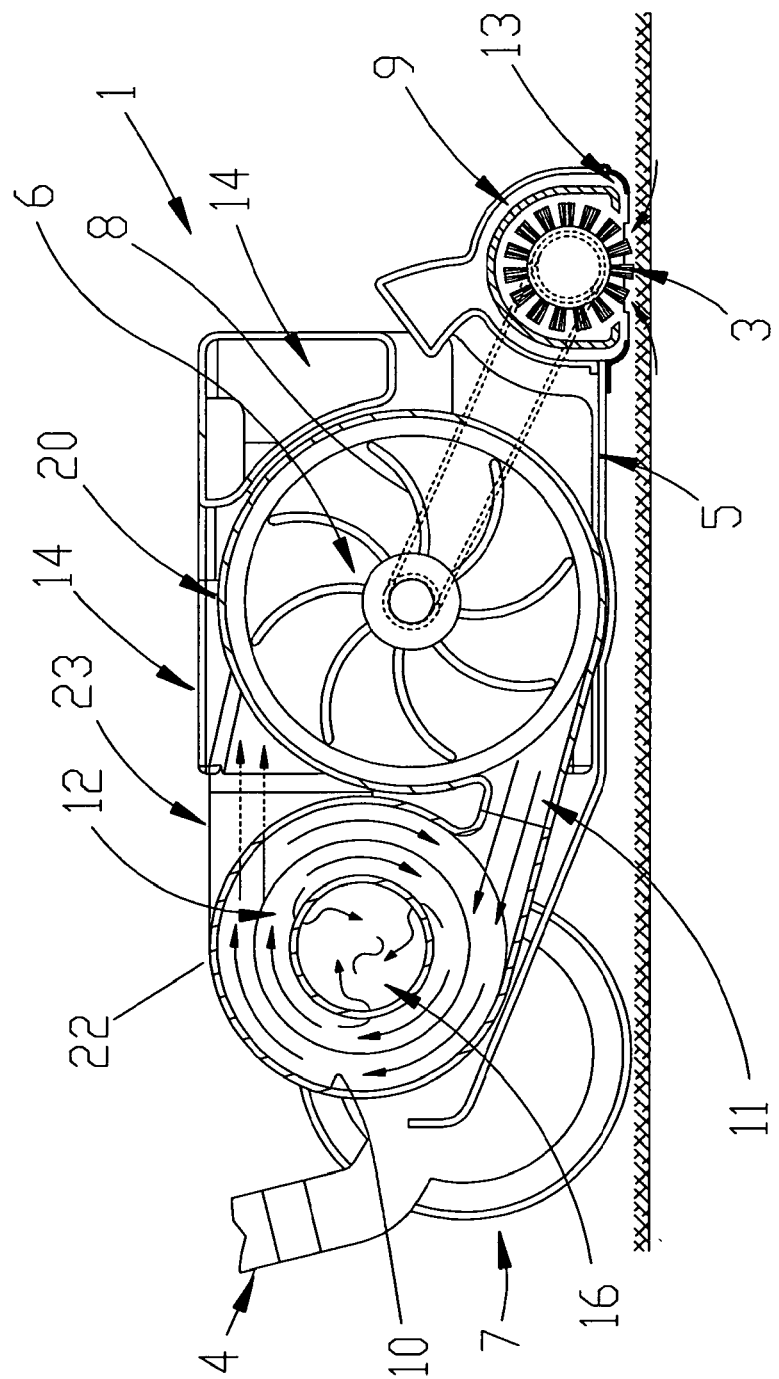
FIG. 4 shows a cross sectional side view of the upright floor sweeper of FIG. 1.

In a preferred embodiment, the vacuum cleaner 1 of the present application preferably includes a pick up head 9 with a power driven carpet brush 3 (See FIG. 4). The suction fan and motor assembly 20 preferably includes an electric motor and impeller, impeller inlet and fan 6 with a tangential discharge outlet that is aligned with the tangential inlet 11 of the primary cyclone separation chamber 10 which has cylindrical walls. The dirt collection chamber 14 may be embodied as a simple non-porous bag or a separate chamber and is connected to a tangential outlet 23 of the chamber 10. A back up filter 18 may be provided as well, if desired. A secondary cyclone separator 65 may also be provided in the discharge flow path of the primary separator chamber 10. This secondary separator 65 is preferably optimized to remove fine particles from the air.

Figure 2:
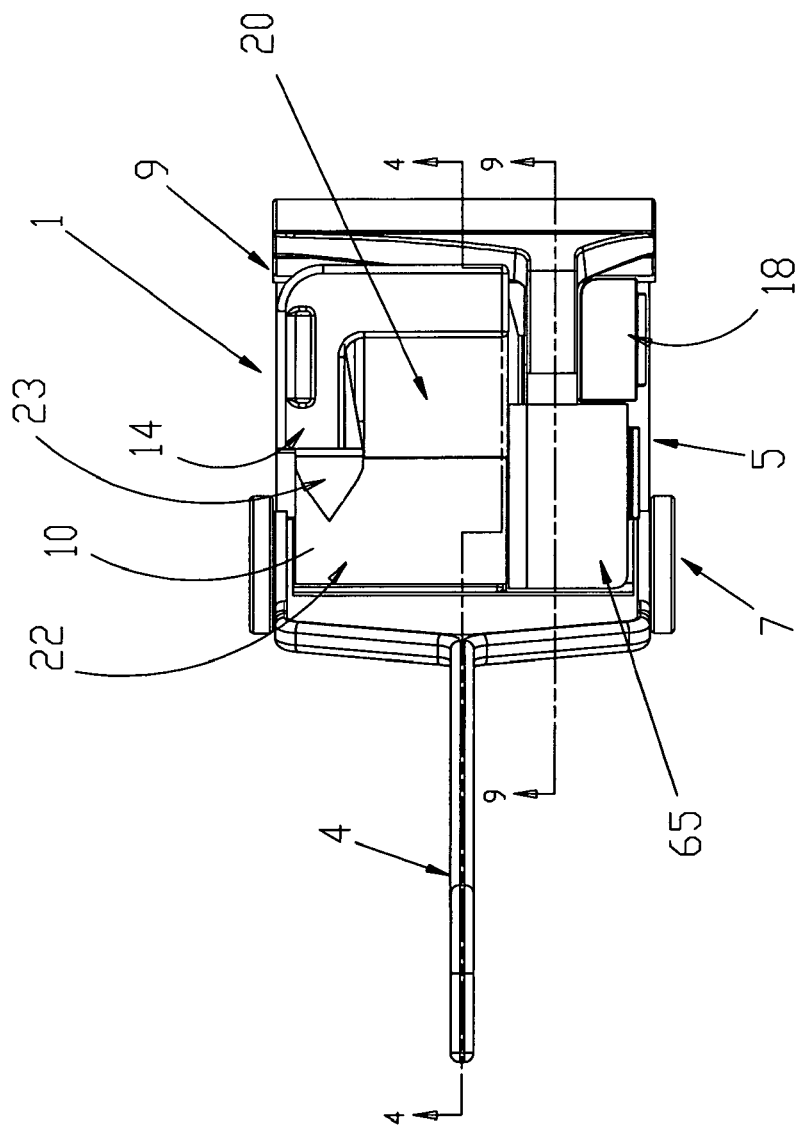
FIG. 2 shows a top view of the vacuum cleaner described for FIG. 1.

Referring to FIG. 2 which is a top view looking down on the vacuum housing assembly 5 of the cleaner 1 of FIG. 1, the air flow path from the dirt pick up head 9 through the suction fan and motor assembly 20 and into the primary cyclone dirt separator chamber 10 can be seen.

Figure 3:
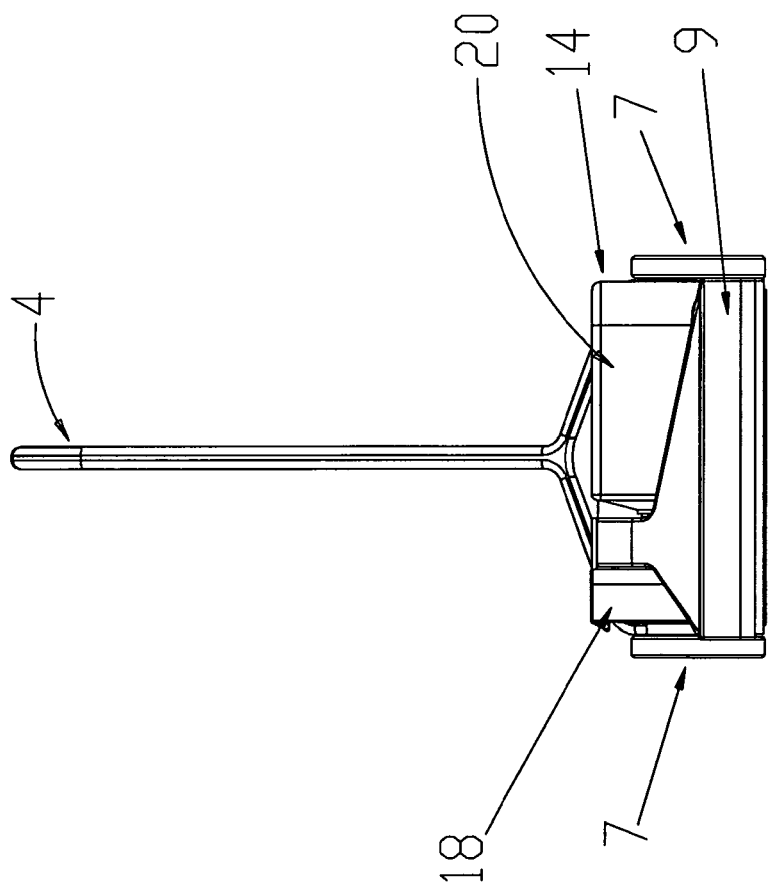
FIG. 3 shows a front view of the conceptual configuration of FIG. 1.
Figure 5:
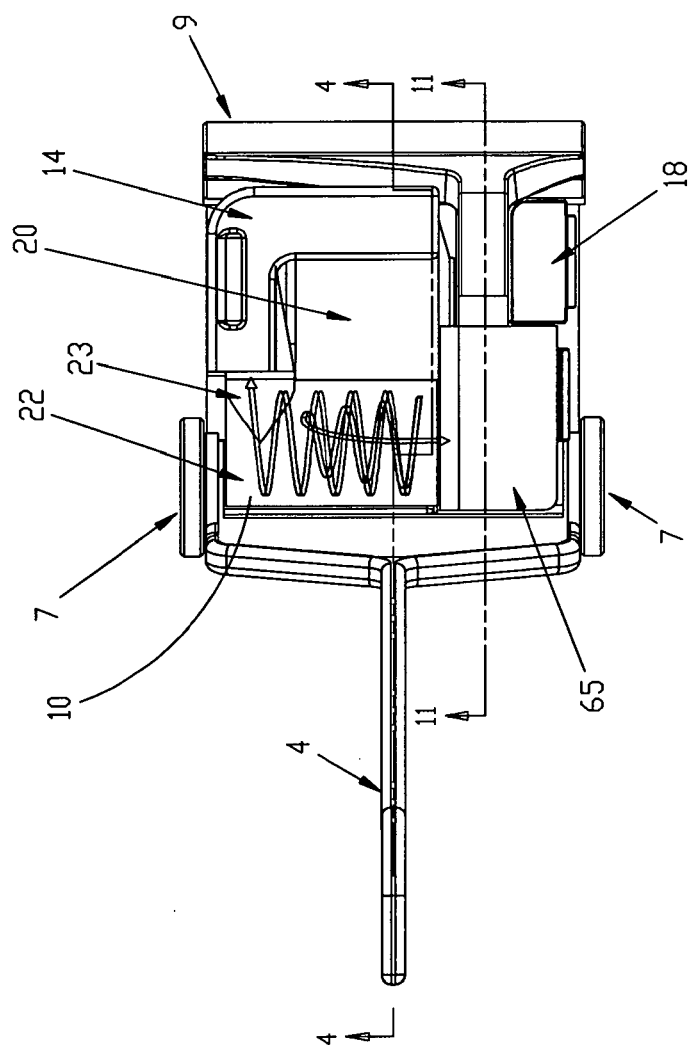
FIG. 5 shows a schematic type top view of the vacuum shown in FIG. 4.
Figure 6:
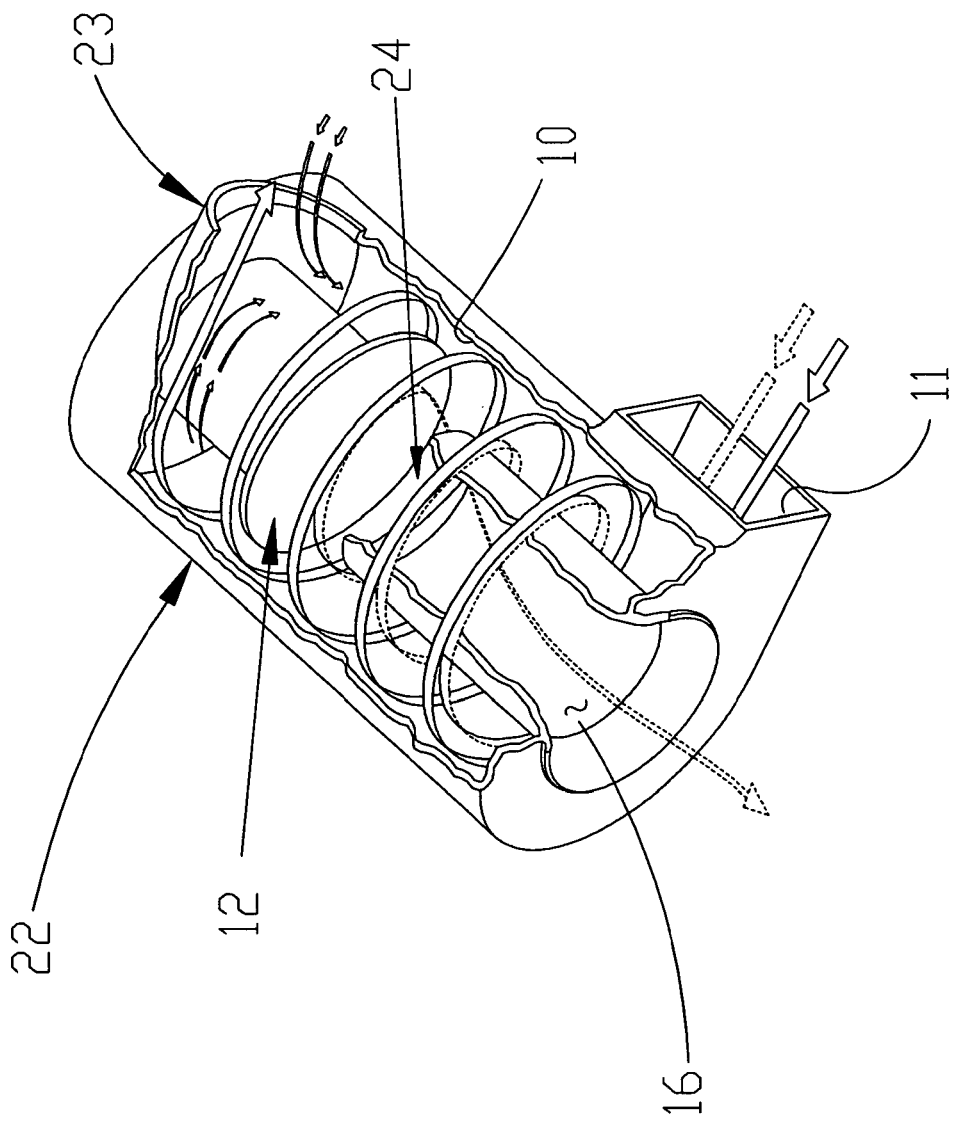
FIG. 6 shows a perspective schematic type view of a basic pressure driven cyclone separator for use with the vacuum cleaner of FIG. 1.
Figure 7:
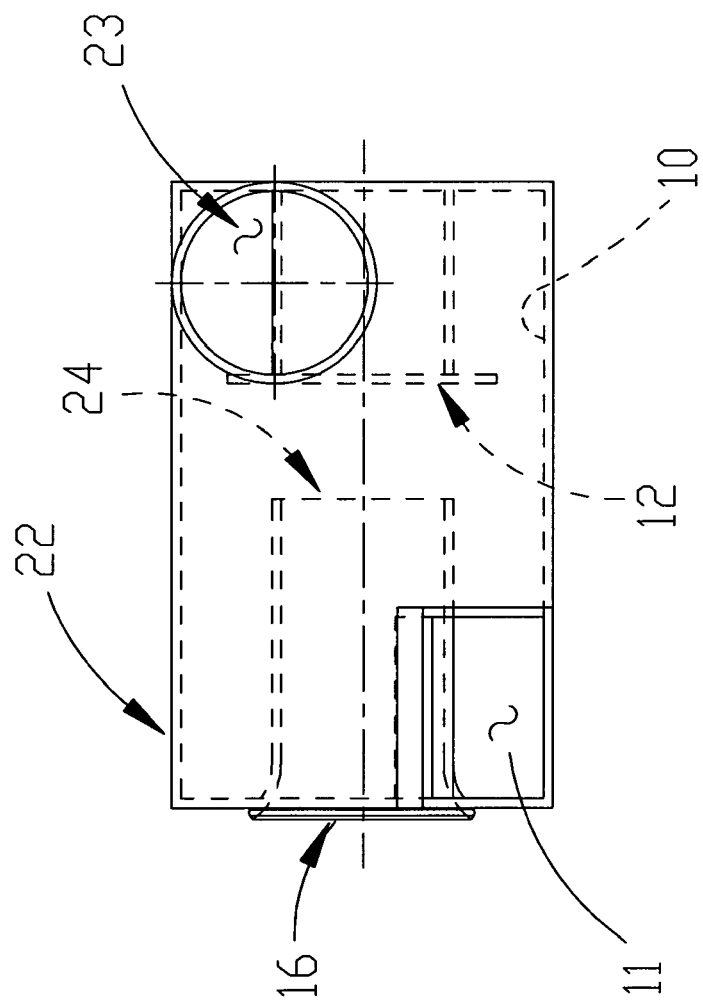
FIG. 7 shows a schematic type side view of a basic pressure driven compact cyclone separator for use with the vacuum cleaner of FIG. 1.

FIG. 3 shows a front view of the cleaner 1 of FIG. 1. FIG. 4 shows a cross sectional side view of the upright floor sweeper cleaner 1 of FIG. 1 showing the direct tangential close coupled connection between the suction motor and fan rotor assembly 20 and the tangential inlet 11 to the cyclone separator chamber 10 along with the brush 3 (add to FIG. 4). The brush 3 may be driven by a belt connected to the fan 6 or motor shaft (not shown). FIG. 5 shows a schematic type top view of the vacuum shown in FIG. 4. FIG. 6 shows a perspective schematic type view of the primary cyclone chamber 10 for use with the vacuum cleaner of FIG. 1. In particular, FIG. 6 illustrates the exit duct 16 which allows cleaned air to exit the chamber 10. It is noted that the separation chamber 10 of FIG. 6, for example may be used in a variety of applications including various vacuum cleaner configurations with the same benefits. FIG. 7 shows a schematic type front view of the primary cyclone separator chamber 10 with tangential inlet 11 and dirt outlet 23 and with the central air exit passage 16 with inlet 24. The baffle plate 12 separates the tangential dirt discharge area proximate the outlet 23 from the recirculation area of the chamber 10.

Figure 12:
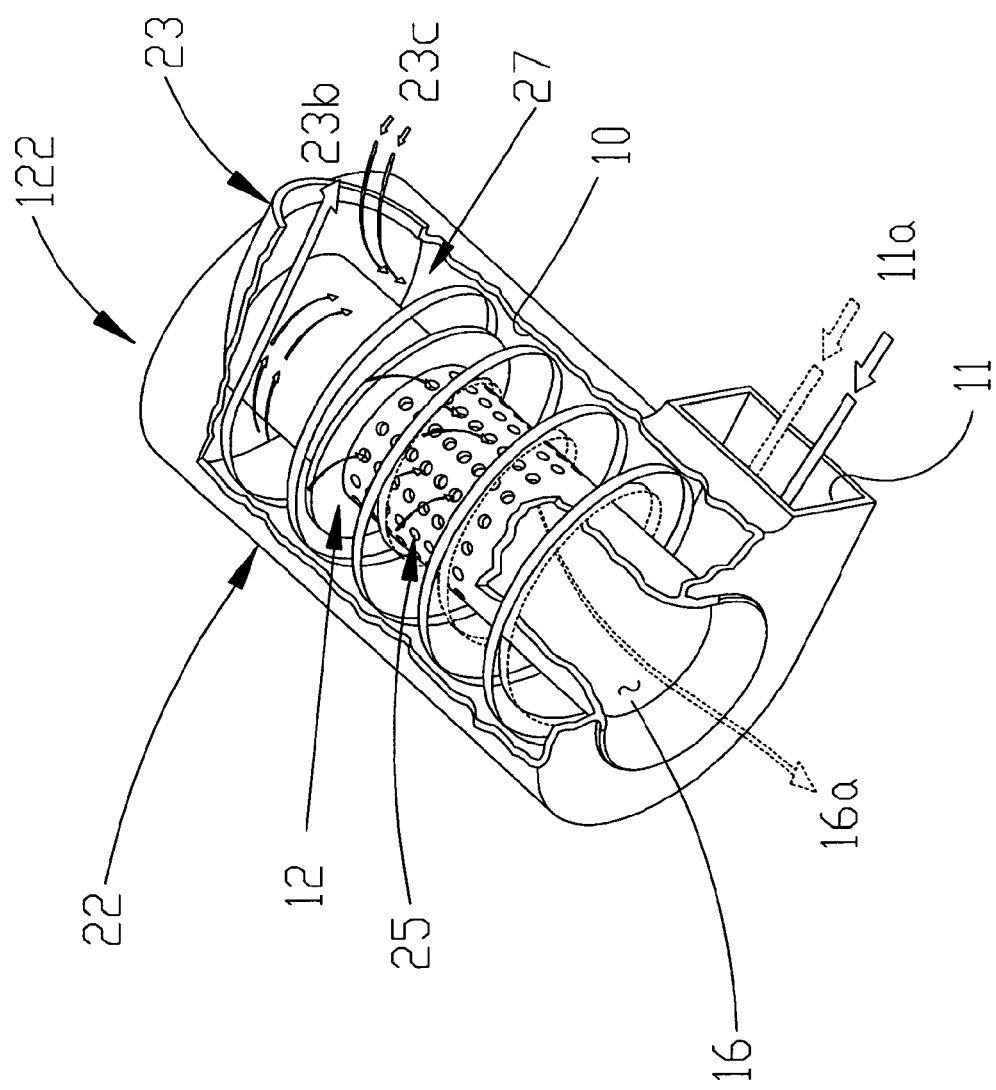
FIG. 12 shows an alternative embodiment of a primary cyclone separator of the vacuum cleaner of FIG. 1.

FIG. 12 illustrates an alternative embodiment of the primary cyclone separation section 22 in which the center central air exit duct 16 include an inlet 24, as illustrated in FIG. 7 covered by a perforated cylinder including a plurality of small diameter holes 25 (i.e. 0.076-0.2 inches) rather than being fully open. The holes 25 provide noise isolation and prevent any large dirt or fluff from carpet being discharged from the chamber 10 during any periods of pressure fluctuation, i.e. momentary pressure fluctuations when the vacuum moves from a carpet to a bar floor.

In operation, the dirt-laden air enters tangential inlet 11 as shown by the airflow lines 11a. The dirt is moved to the outer walls of the chamber 10 by the centrifugal force resulting from the high velocity of the inlet dirty air and the relatively small diameter of the chamber 10. The centrifugal dirt separation force may be determined based on the following equation:

$$F=w/gv^2/r$$

where "F" represent the centrifugal force, "w" represents the weight flow, g is a gravitational constant, "v" is the velocity of the air and "r" is the inside radius of the chamber 10. The dirt particles move down the chamber 10 and pass the baffle plate 12 to be discharged from the chamber 10 at high velocity out of tangential outlet 23. The outlet 23 is preferably connected to the collection chamber 14, or to a bag to collect the dirt. The lighter air that accompanies the dirt into the chamber 14 is recirculated back as is illustrated by the line 23c of FIG. 12 and into the chamber, or swirl area 27 downstream of the baffle 12 and recirculated in this area. The air flow exits the cyclone separator chamber through the holes 25 in the duct 16. This exit air is very clean due to the high centrifugal force in the chamber 10, which separates particles form the airflow. Only the clean air near the center of the chamber 10 is allowed to exit.

Figure 13:
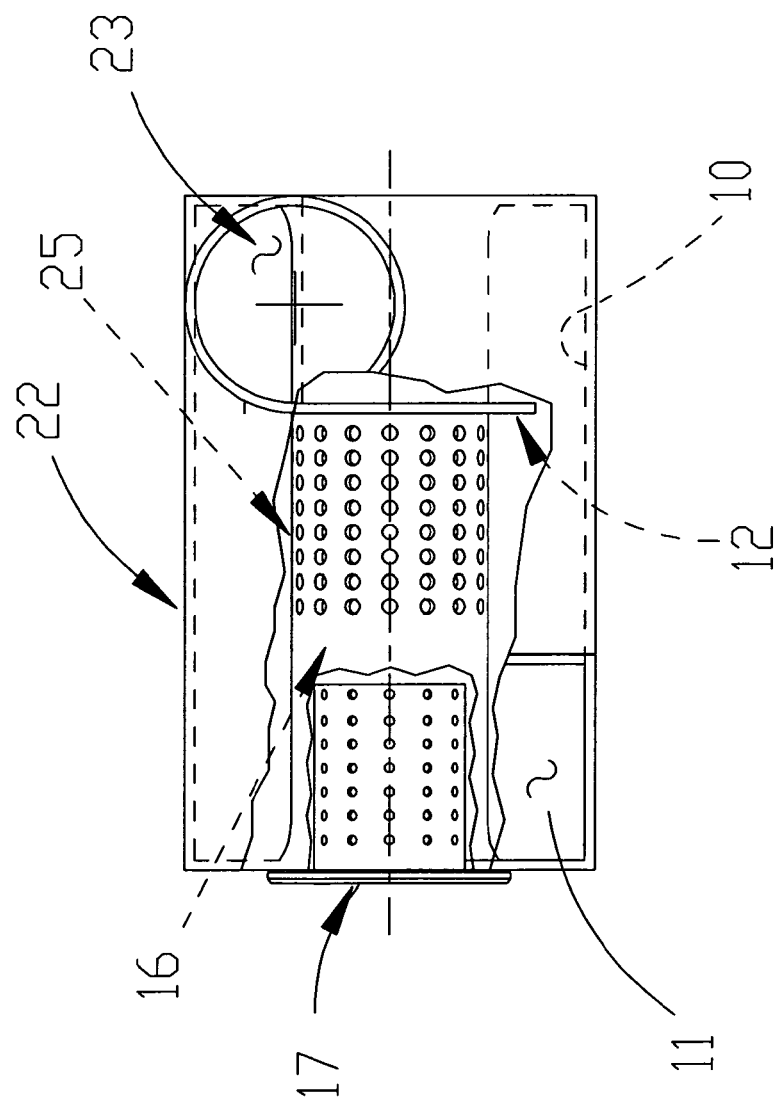
FIG. 13 shows a side view of an embodiment of a primary cyclone separator for the vacuum cleaner of FIG. 1.

FIG. 13 shows a side view of the primary cyclone separator chamber 10 with an additional perforated liner duct, or insert, 17 inserted into the duct 16 to provide sound (noise) dampening. The duct 17 is designed to provide a Helmholtz resonator effect due to its hole sizes and cavity spacing behind the liner walls to reduce the noise emitted from the cleaner 1, for example.

Figure 10A:
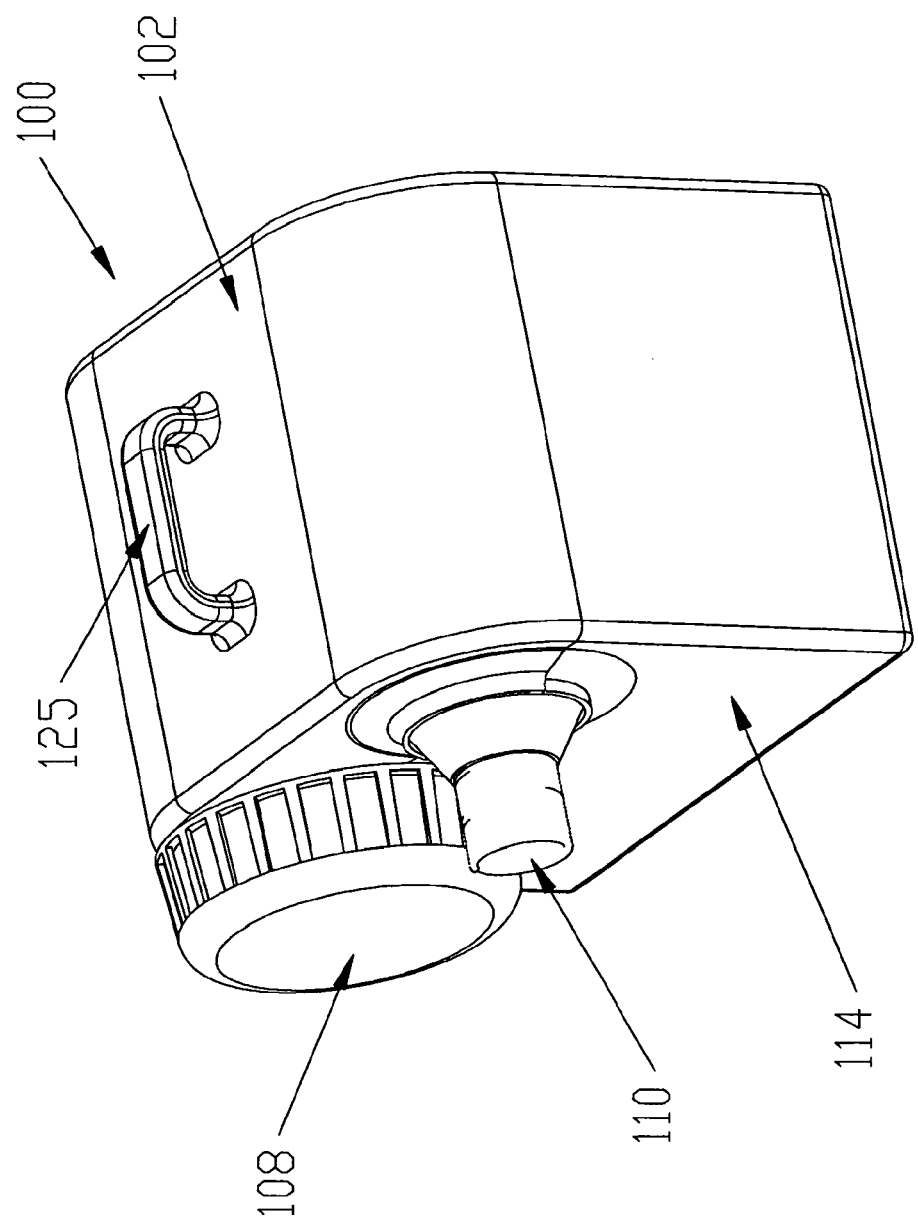
FIG. 10a illustrates an alternative embodiment of a vacuum cleaner in accordance with the present invention.

FIG. 10a shows a conceptual perspective view of a canister type or shop vacuum cleaner 100 in accordance with another embodiment of the present application. The cleaner 100 preferably includes a top cover and frame 102 on which the basic vacuum cleaner elements may be mounted, including, suction fan motor and fan assembly 120, centrifugal separator 122, and final filter 108. A vacuum hose (not shown) may be attached to the suction fan inlet 110. Further, there is preferably a carrying handle 125 provided along with a lower dirt collecting housing 114.

Figure 11A:
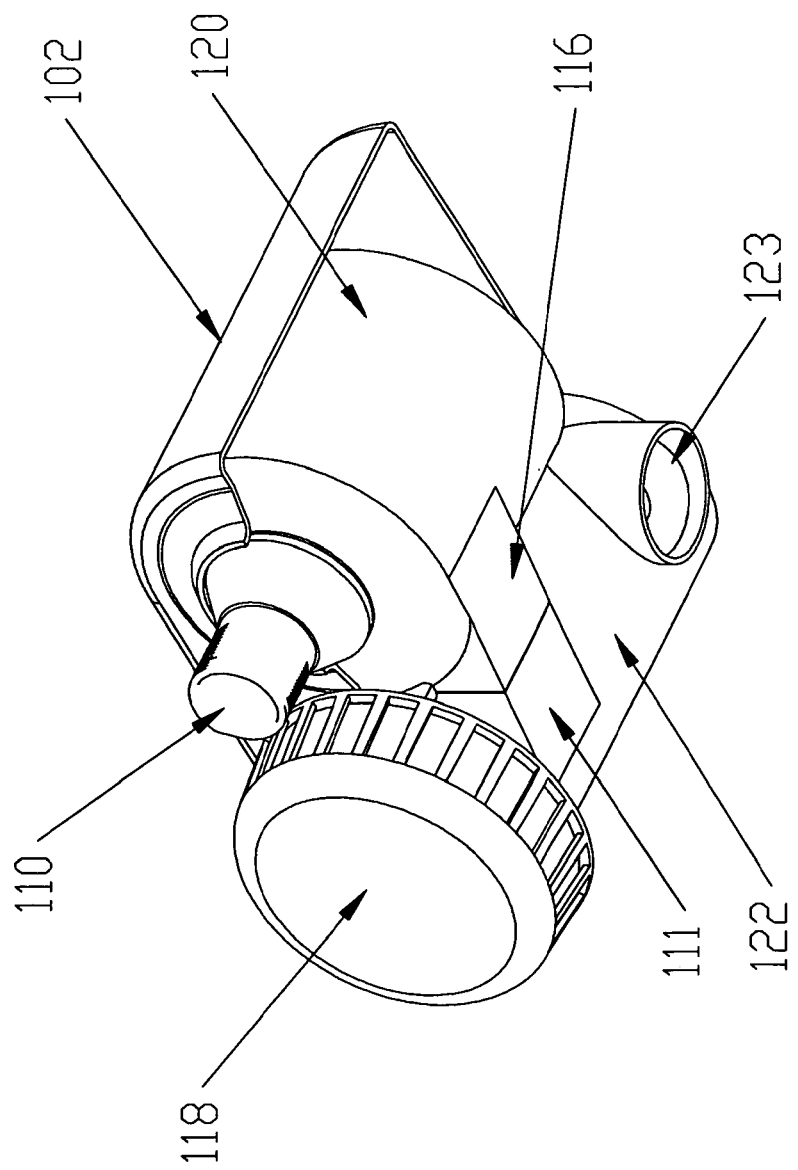
FIG. 11a shows the vacuum cleaner of FIG. 10a with a bottom dirt collector removed.

FIG. 11a illustrates cleaner 100 of FIG. 10a without the dirt collecting housing 114 such that the mounting of the basic components 120, 122, 118/108 can be seen as well as the tangential inlet 111 to the centrifugal separator 122 and the suction fan tangential discharge port 116 as well as the tangential dirt discharge port 23 of the centrifugal separator 122.

Figure 10B:
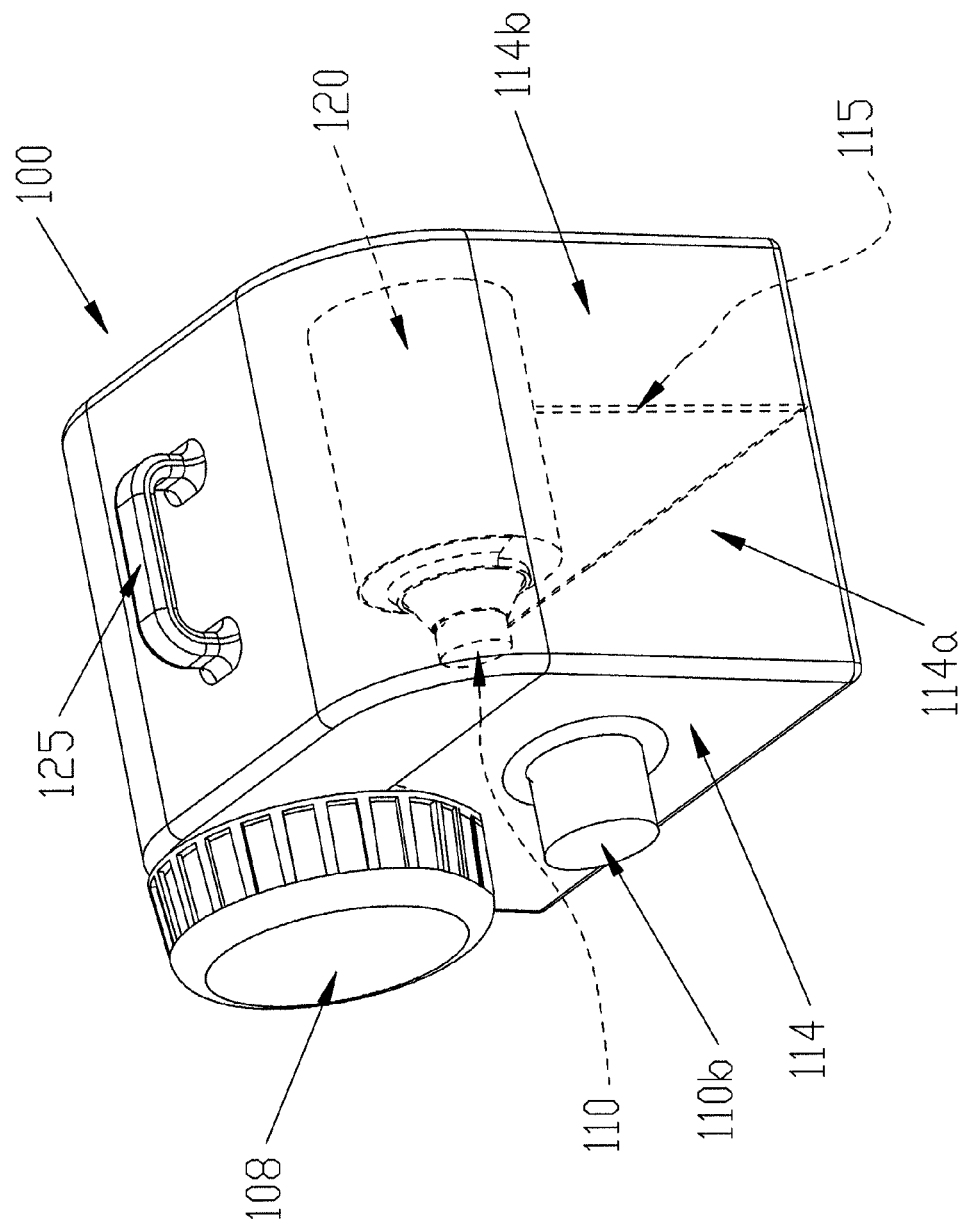
FIG. 10b illustrates another alternative embodiment of a vacuum cleaner in accordance with the present invention.

In FIG. 10b, the suction fan inlet 110 is shown connected to the inside top area of 120 of the primary dirt collection chamber 114a where the inlet 110b to the vacuum cleaner 100b is moved to enter the primary dirt collection chamber 114a. This positioning allows nails or other large items of debris commonly cleaned using a shop vacuum to be collected before the air passes through the fan. In addition, if the vacuum 100b is used to pick up water, for example, the majority of the water will be trapped in the main container 114a before complete separation is achieved by the primary cyclone separation chamber. Thus, the collector chamber preferably includes low pressure side 114a and a fan discharge pressure side 114b that collects dirt or water separated from the suction air and discharged from the separator 122 out tangential discharge outlet 123 into the chamber 114b.

The design of FIG. 10b represents a much improved shop vacuum (or wet pick-up shop vacuum) which typically only clean air with a washable sponge or cloth filter such that the discharged air is often very dusty. Similarly, when liquid is picked up, the discharge air tends to be very wet since the filter is saturated by water still in the air that is passing through the discharge opening.

Figure 11B:
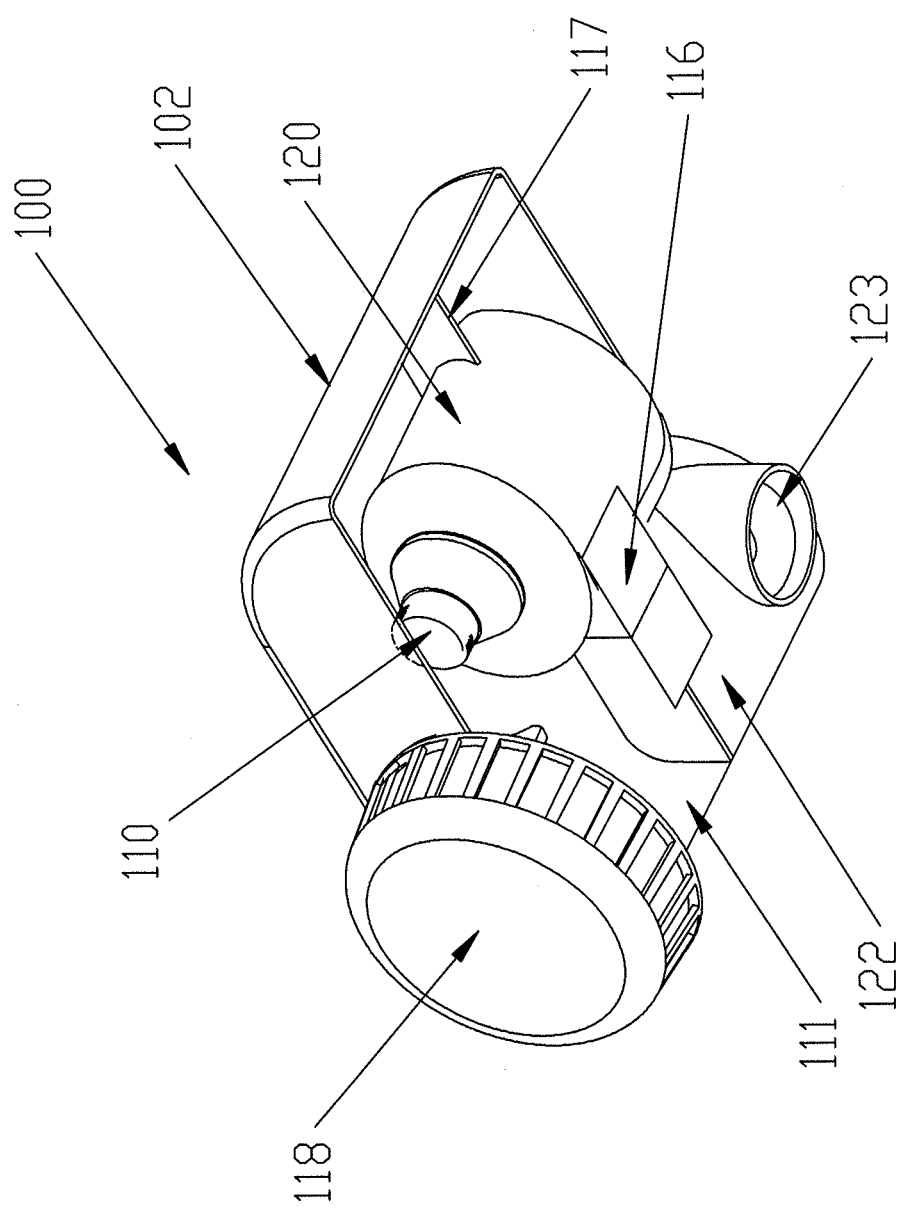
FIG. 11b shows the vacuum cleaner of FIG. 10b with a bottom dirt collector removed.

FIG. 11b shows the under side of the vacuum top assembly of FIG. 10b with the container 114 removes. The motor and suction fan inlet 110 is now relocated inside the vacuum cover 120 to provide suction by inlet 110 directly into the container portion 114a.

Figure 14A:
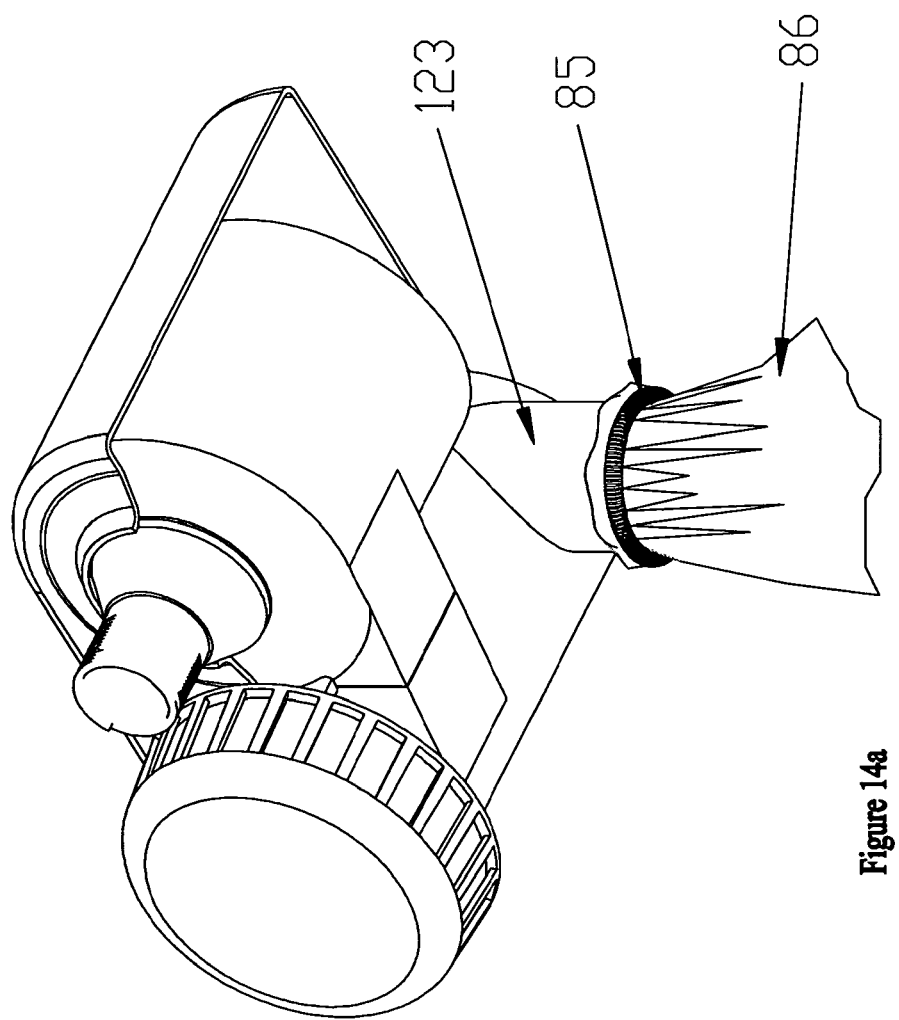
FIG. 14a shows an alternate configuration of the vacuum cleaner of FIG. 10.
Figure 14B:
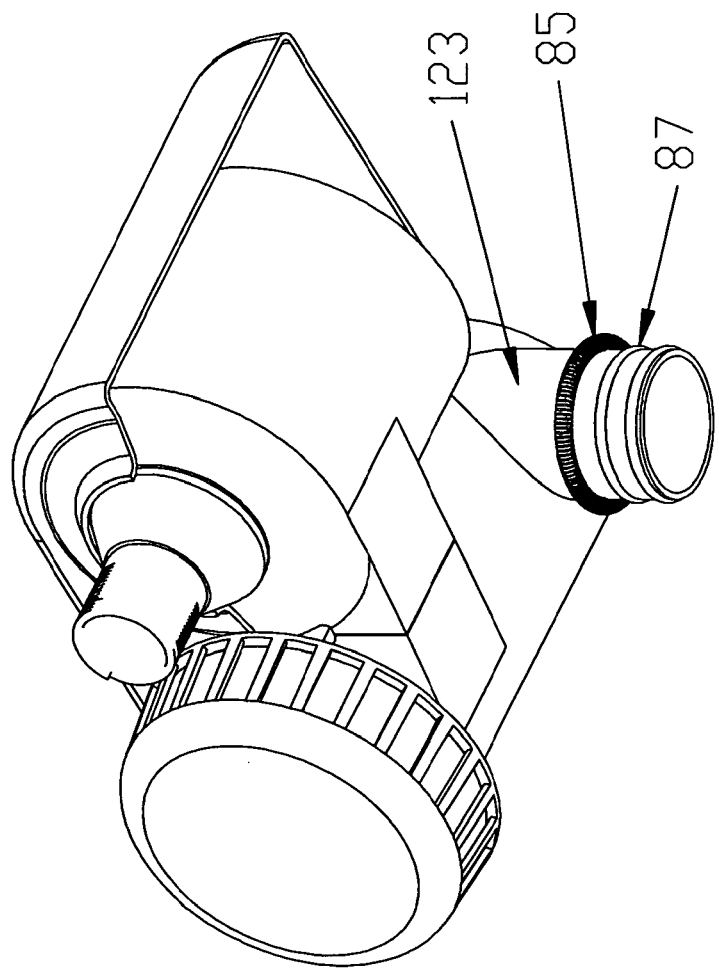
FIG. 14b shows the vacuum cleaner of FIG. 14a with the dirt bag removed and the retention spring rolled back.
Figure 15:
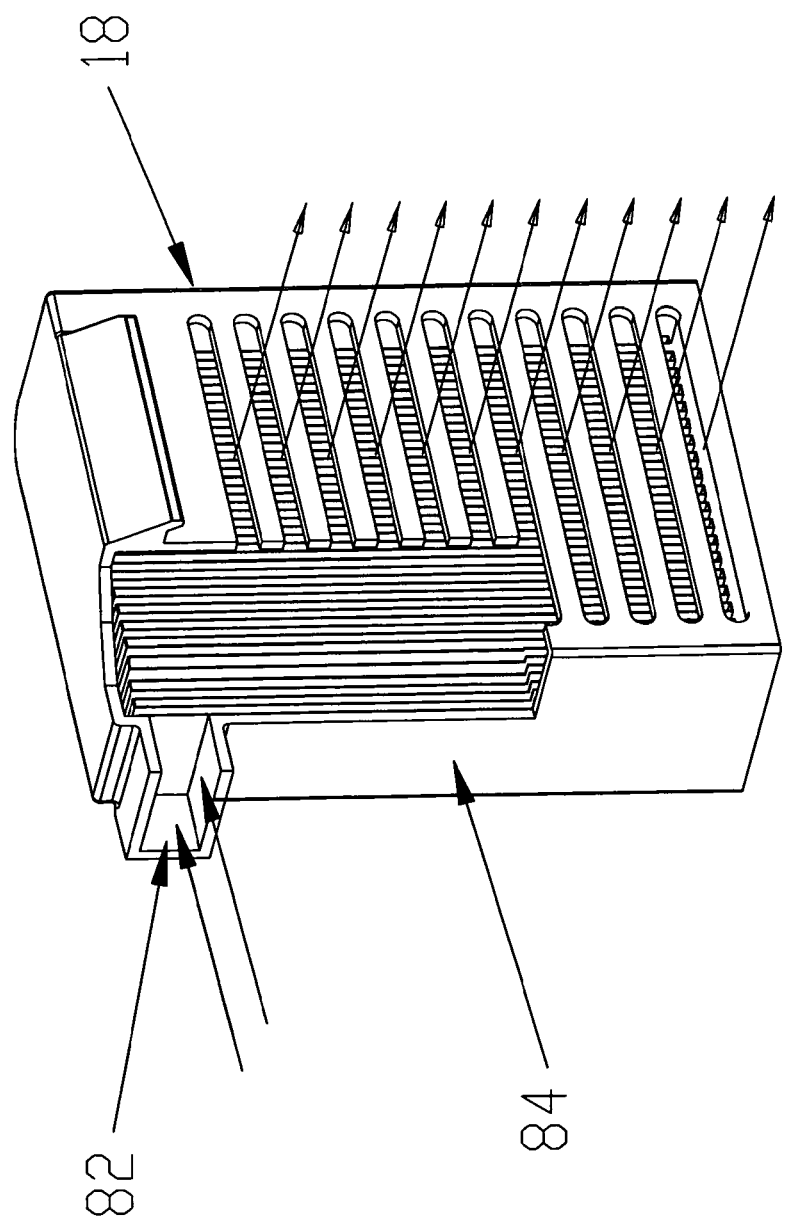
FIG. 15 is an exemplary illustration of a HEPA type very small particle filter for use with the vacuum cleaner of the present application.

FIG. 14a illustrates an alternate configuration of the vacuum cleaner 100 of FIG. 10a with a non-porous plastic or paper bag 86 attached to the cyclone chamber's tangential discharge 123. The throw away bag 86 is preferably held in place with a roll spring 85 which can be rolled over the bag opening to clamp it to the tangential dirt discharge duct. FIG. 14b shows the vacuum cleaner 100 with the dirt bag 86 removed and the retention spring 85 rolled back to expose slot 87 which is preferably formed on the outlet 123 to accommodate the spring 85 to keep the bag 86 in place. The shop vacuum cleaner of FIGS. 10b and 11b may also utilize a bag as well to collect discharge dirt, if desired. The bag may be positioned in, or in place of the chamber 114b, if desired FIG. 15 is a partial sectional view of the HEPA type very small particle filter 18 that is shown on the upright floor sweeper vacuum cleaner 1 of FIG. 1, or on the alternative embodiment of FIG. 22, discussed below. The filter 18 preferably receives air discharged from the secondary cyclone separator 65 in FIG. 1, or to the air discharge duct of the primary or secondary separator sections of the embodiment of FIG. 22. The filter 18 provides for final air filtration if desired. The filter 18 preferably includes a housing 84 and an inlet 82 into which the cleaner air from the primary and secondary cyclone separation sections 22, 65 pass for final filtering.

Figure 16:
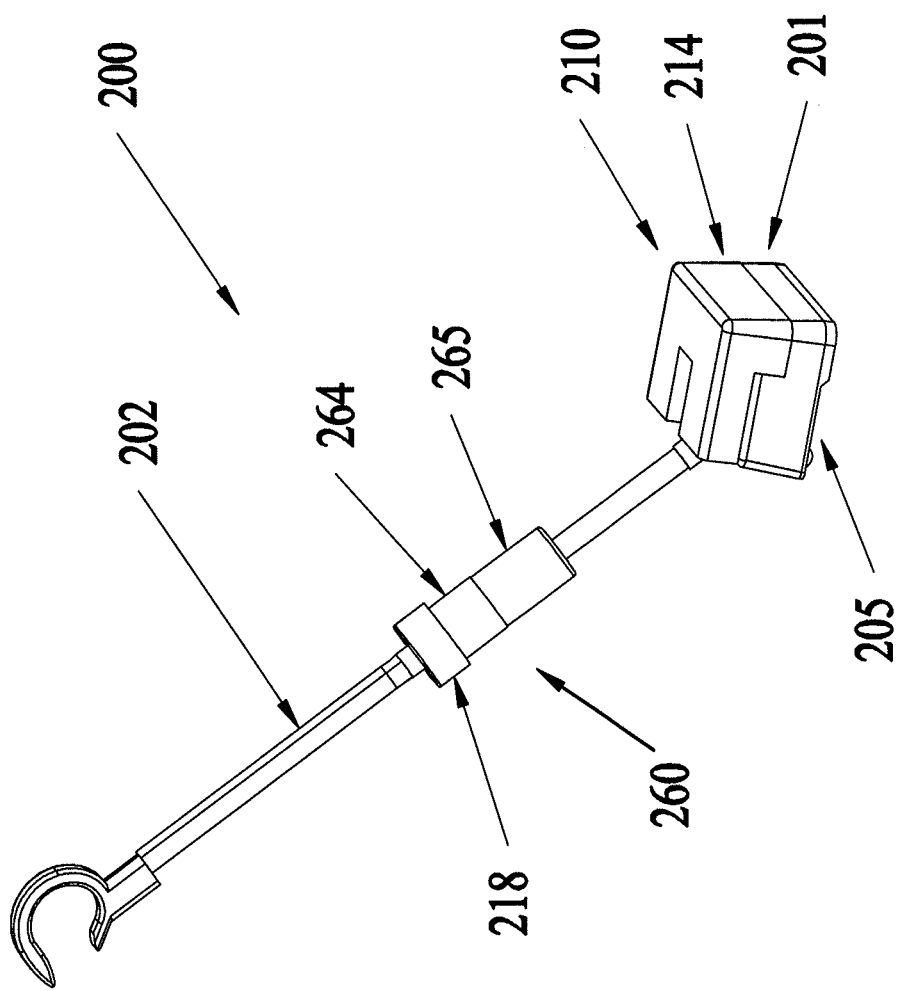
FIG. 16 illustrates another exemplary embodiment of a vacuum cleaner in accordance with the present application.

FIG. 16 illustrates a compact, light weight cyclone (centrifugal) dirt separator, bagless re-circulated air and sound suppressed vacuum cleaner 200 in accordance with an embodiment of the present application. The vacuum cleaner 200 preferably includes a suction fan drive motor 220, fan 206, a large dirt centrifugal separator section 222 connected to the suction fan inlet 217 and a large collection chamber 214, where all of these components are mounted in the floor housing 201. See also FIG. 17

Figure 22:
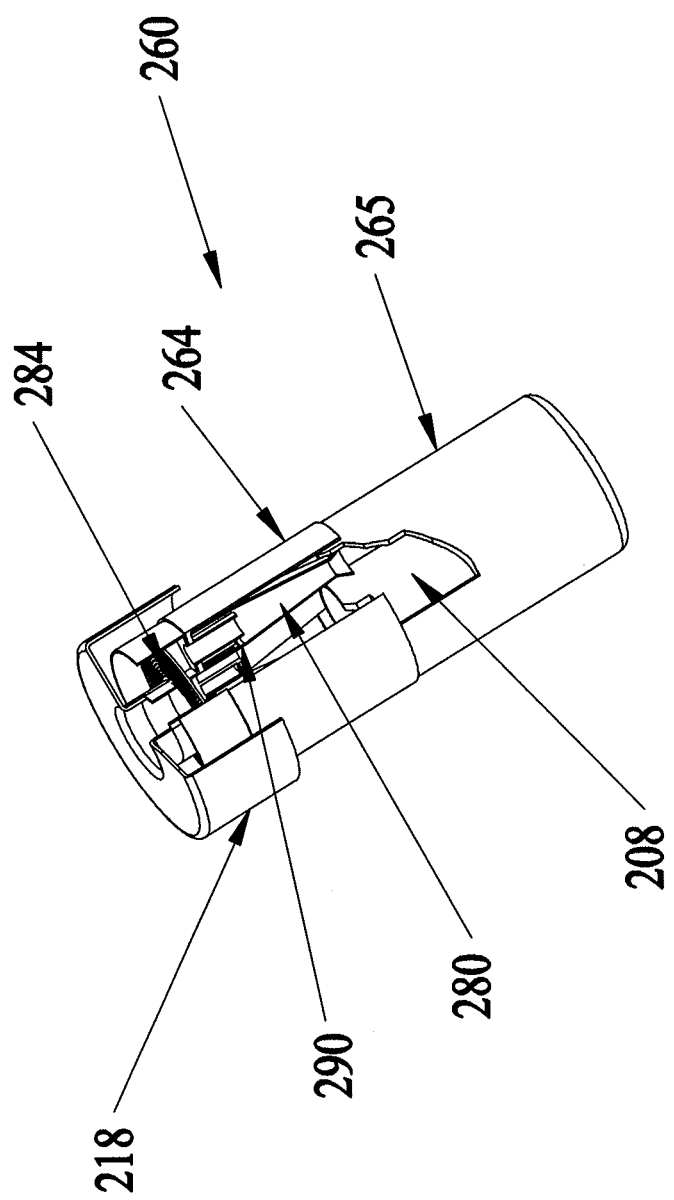
FIG. 22 shows a secondary cyclone separator suitable for use in the vacuum cleaner of FIG. 16.

A handle 205 is preferably pivotally attached to the housing 201. A secondary cyclone separator section 260 is preferably mounted on the handle 205, which is at least partially hollow to allow air to flow from housing 201 to the separator 264. A second removable dirt collector 265 is provided with the secondary separator 264 which is for very fine dirt and need only be cleaned periodically. In addition, a HEPA filter 284 may also be provide to provide additional final filtering, if desired, as shown in FIG. 22.

Figure 17:
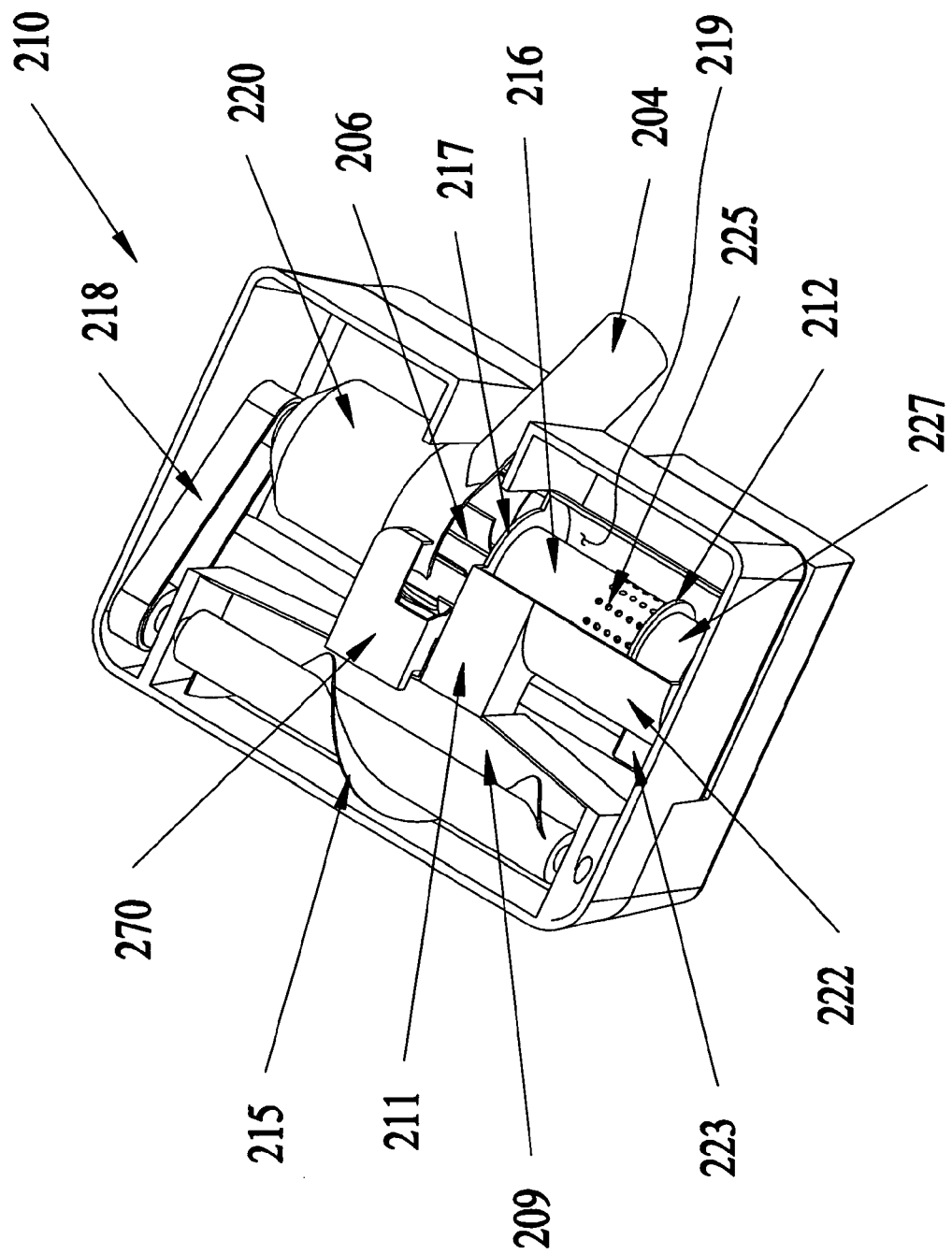
FIG. 17 shows a bottom view of the vacuum cleaner of FIG. 16 without a bottom cover.

FIG. 17 shows an internal perspective view of the housing 201 with a bottom cover removed such that the major components are visible. As illustrated, the primary cyclone separator section 222 is mounted adjacent to the suction fan motor and housing 220. The fan 206 rotates to create suction and pull dirt and air from the pick up head area 209 through the tangential inlet 211 and into the cyclone chamber 219 of the separator 222. The dirt rotates in the chamber 210 at high velocity and moves to the inner surface of the outer walls of the chamber and past the baffle 212 into the discharge area 227 from which it is discharged through tangential outlet 223 into the removable large dirt collector or bag 214 shown in FIG. 16. A belt 218 is preferably connected to a shaft of the motor or fan and is used to rotate brush 215 in the pick up head area 209 to help lift dirt off the floor. An exit duct 216 is positioned in the chamber 219 to allow the cleaned air to exit the chamber through the holes 225 formed in a wall therein. The duct 216 is connected to the fan inlet at 217. Element 227 refers to the dirt swirl section, or collection section, of the chamber 219 which is downstream of the baffle 212 and includes the tangential dirt discharge outlet 223 for the dirt to be blown into the removable large dirt container 214. Another advantage of discharging the dirt from the cyclone chamber is that the large dirt collection chamber or bag can take any desired shape to maximize dirt volume storage efficiency.

The suction fan 206 air is discharged into the hollow handle mounting 204 with some or most of it being provided to the collection duct 270 for connection to a jet assist slot 271 (See FIG. 18) in the bottom cover 205. Jet assisted suction is discussed above with reference to the vacuum cleaner 1 of FIGS. 1-9, for example. Generally, the high velocity air produces a low-pressure area just above the carpet or floor due to the Bernoulli effect.

Figure 18:
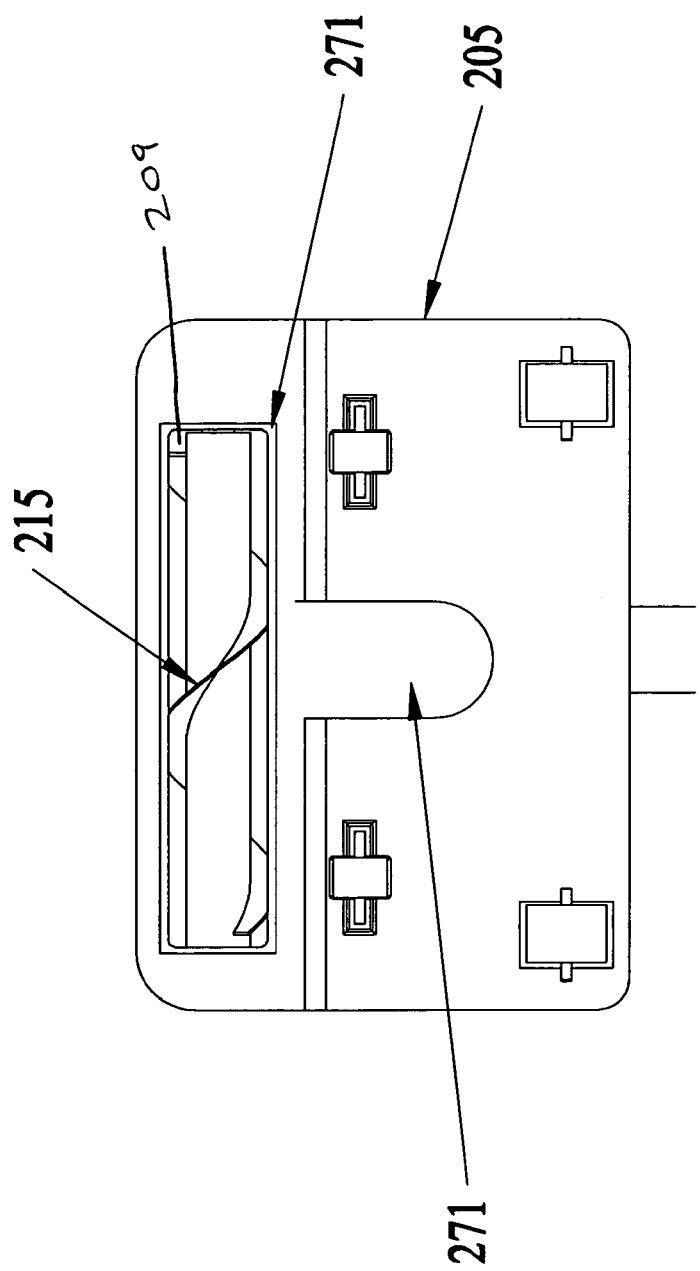
FIG. 18 shows an external view of the bottom of the vacuum cleaner of FIG. 17 with the bottom cover in place.

FIG. 18 shows a bottom view of the vacuum cleaner 200 of FIG. 17 with the bottom cover replaced. In addition, a recirculation air jet assist slot 271 around the suction pick-up opening 209 is shown with the rotating floor brush 215.

Figure 19:
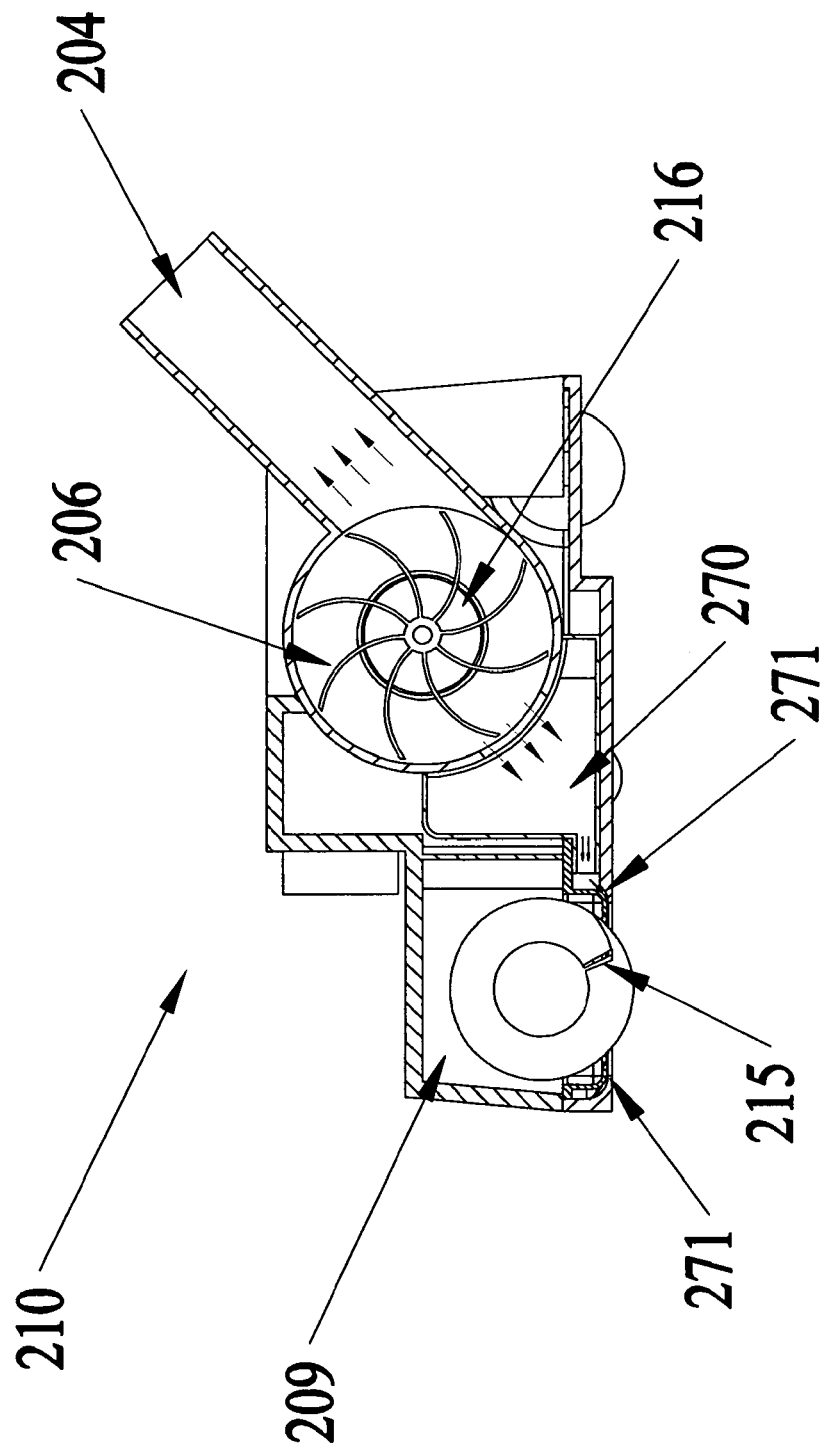
FIG. 19 shows cross sectional side view of the vacuum cleaner of FIGS. 16-18.

FIG. 19 illustrates a cross sectional view of the housing 201 illustrating how a portion of the cleaned air from the chamber 10 can be redirected to the jet assist slot 271 of the head area 209 while other air is directed up the hollow handle portion 204 to the secondary separator 265.

Figure 20:
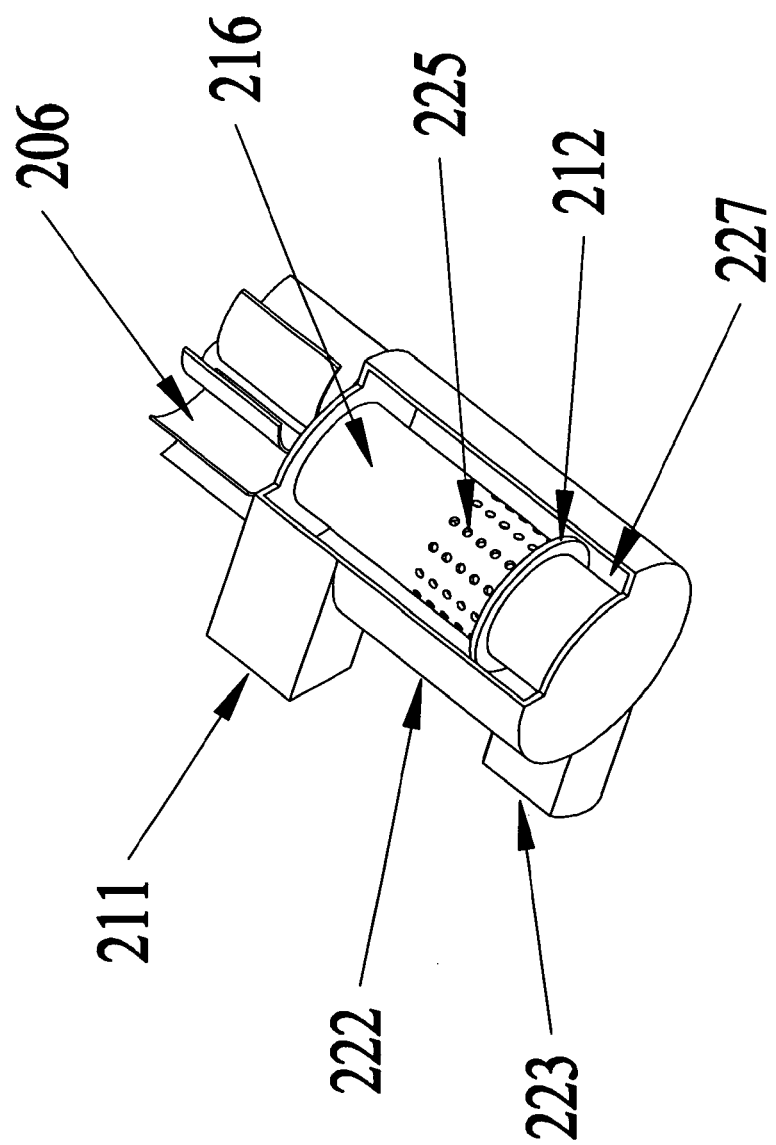
FIG. 20 shows a more detailed view of the primary cyclone separator of the vacuum cleaner of FIGS. 16-19.

FIG. 20 is a schematic view of the centrifugal dirt separator section 222 and suction fan 206. As illustrated, the exit air duct 216 of the chamber 210 is connected to the inlet of the fan 206. FIG. 20 also illustrates the relationship of the tangential inlet 211 of the chamber 210 and the tangential dirt outlet 223 as well as the openings 225 that are preferably formed to provide an inlet for the exit duct 216 to allow the cleaned air to escape chamber 222. The suction fan 206 is shown attached to the centrifugal separator exit duct 216 so as to provide noise isolation from the intake of the vacuum cleaner 200 near the suction head area 209

Figure 21:
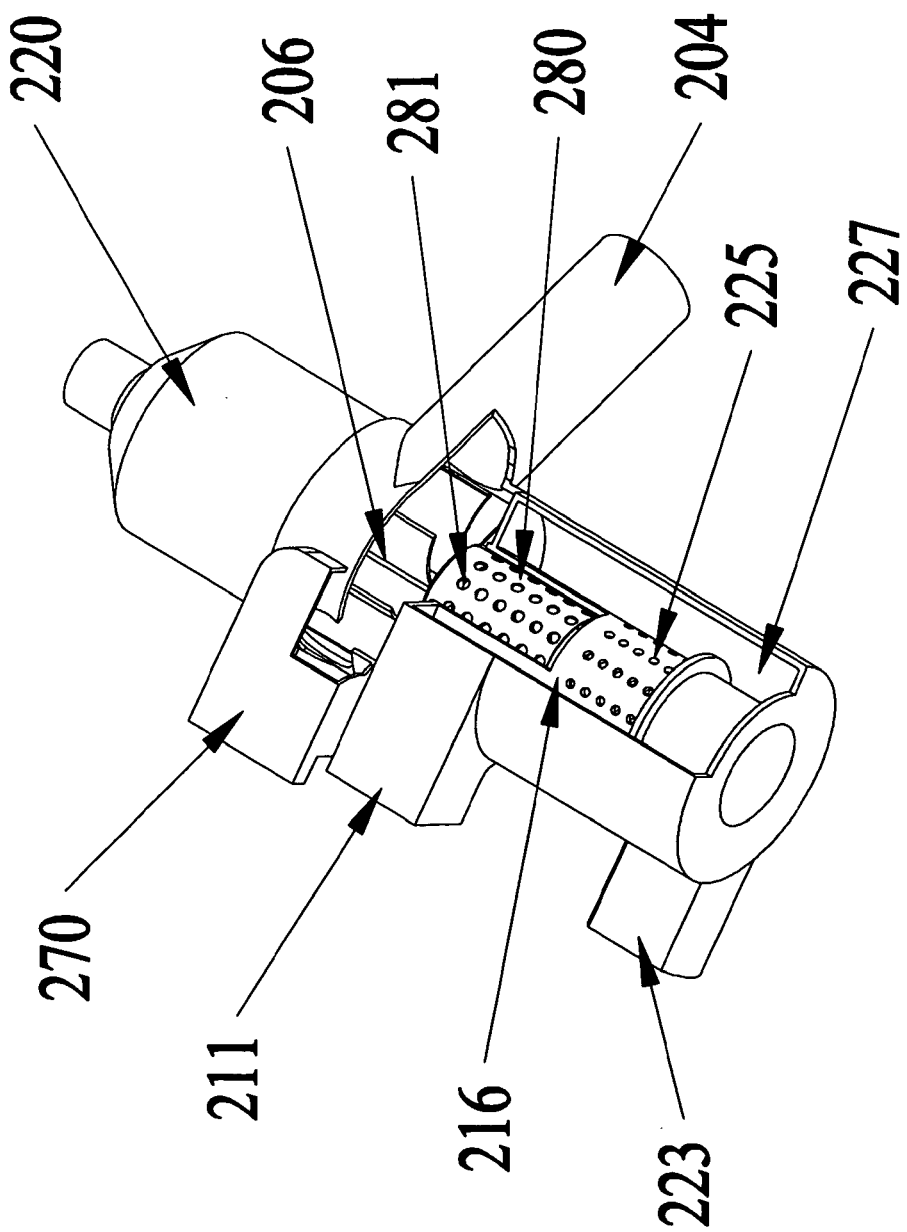
FIG. 21 shows an alternative embodiment of the primary cyclone separator of FIG. 20.

FIG. 21 is an improvement on the features illustrated in FIG. 20. In this embodiment, a second insert 280 provided in the air exit duct 216 to provide Helmholtz dampening of sound. This absorbs the high velocity fan blade and high velocity air noise from coming back out the inlet 211.

FIG. 22 illustrates the secondary cyclone separator 260 mounted on the handle 205 of the cleaner 200. The separator 264 is optimized for separating very small particles from the cleaned air provided from the primary separator 222. The separator chamber 264 thus includes a plurality of small diameter chambers 290 similar to the chambers 60 described above with reference to FIGS. 8a and 8b. The chambers include small tangential inlets and tapered walls but are arrange around the handle 204. Slots are provided in the handle 205 to correspond to these inlet slots. The cup 265 is provided for dirt collection and is preferably removable. In one embodiment a disposable bag may be placed into the cup 265 to collect dirt.

Figure 23:
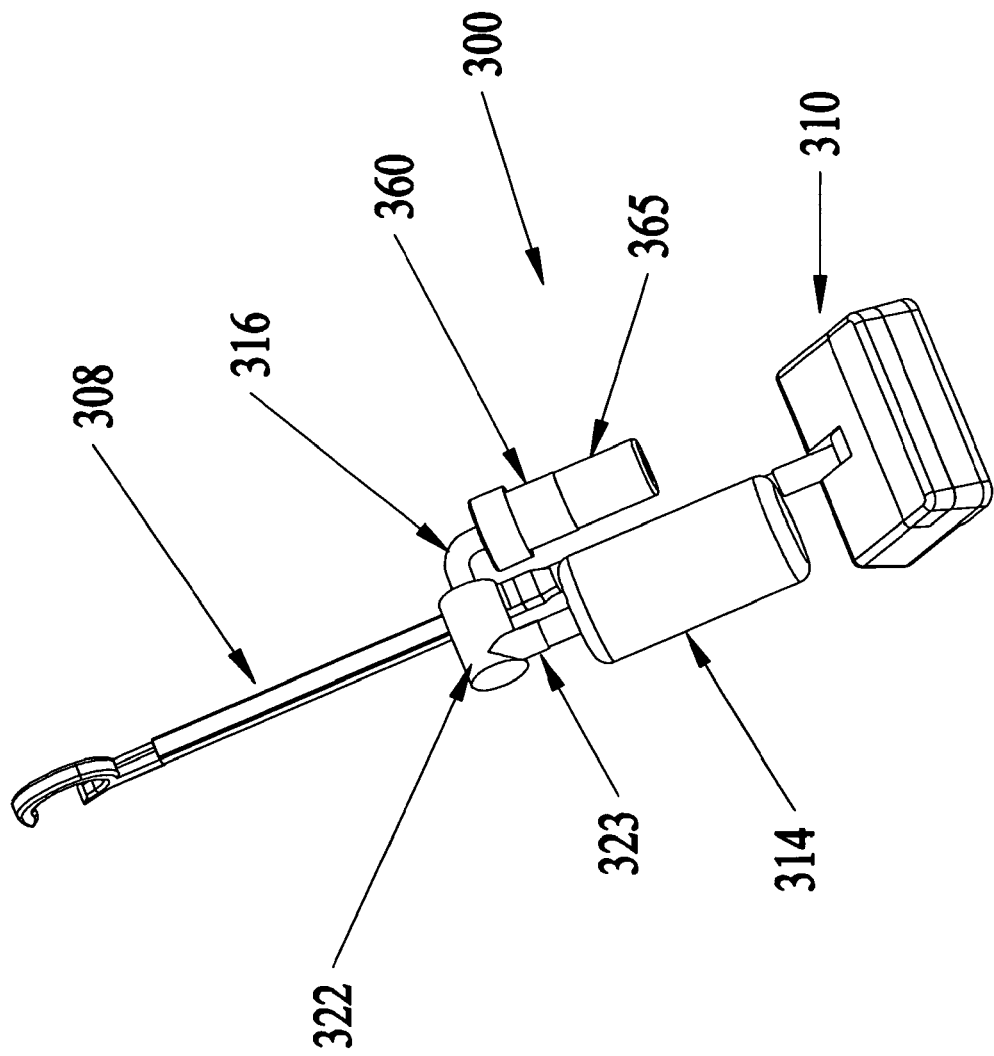
FIG. 23 illustrates a vacuum cleaner in accordance with another embodiment of the present application.

FIG. 23 illustrates an alternative embodiment of a vacuum cleaner 300 where the primary cyclone separator 322 is mounted on hollow handle 308 and the larger dirt and much of the very small dirt is deposited into a non-porous bag or container 314. The container 314 may be made larger in this embodiment since it is not part of the floor assembly. Secondary cyclone separation is provided in the separator 360, which may also include a HEPA filter, if desired. The first and second separators 322, 360 however are similar to those described above with reference to vacuum 200.

Figure 24:
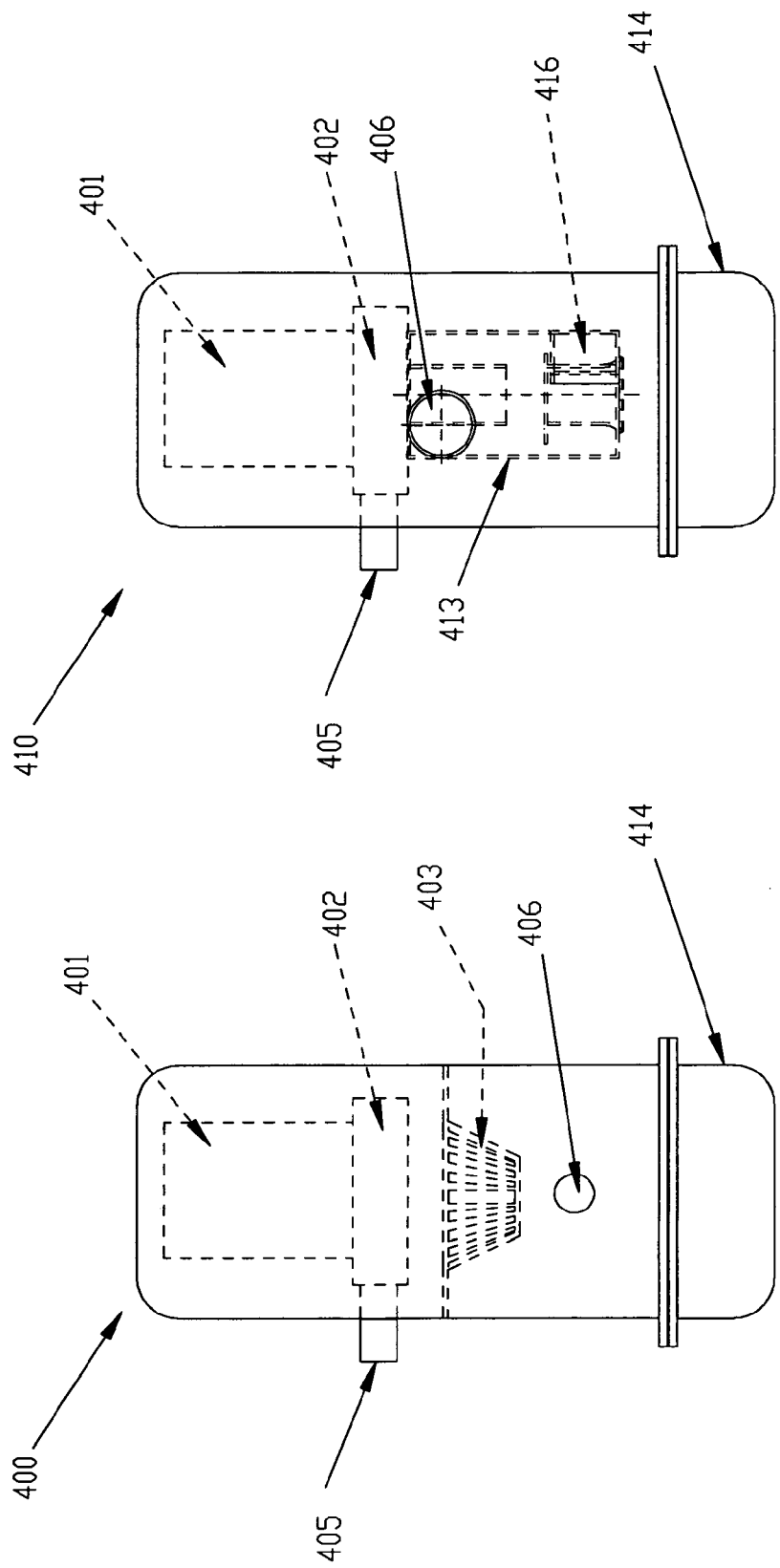
FIG. 24 shows an illustration of a high performance cyclone separator of the concept illustrated in FIG. 6 applied to replace a cleanable filter cloth in a central vacuum system in accordance with an embodiment of the present invention.

FIG. 24 shows the application of the disclosed cyclone separator illustrated in FIGS. 6 and 12, for example, in place of the cleanable filter 403 commonly used in central vacuum systems. Generally, in conventional systems such as system 400 dirt is sucked into a removable container 414 as shown in FIG. 24, so it can be discarded. However, the air is typically filtered by a cloth bag or other cleanable filter (see element 403, for example) which is dusty to clean and reduces performance of the system as it gets clogged with dirt and dust.

In accordance with the present application, the central vacuum 410 has element 401 which represents a suction fan drive motor, and element 402 representing the suction fan while the cyclone separator is identified as element 413 which can be used to replace the filter 403 in the housing of a central vacuum cleaner 400. The inlet port 406 from the central home vacuum is connected to the house vacuum piping which is connected to the tangential inlet of the separator 413. A center air discharge duct similar to duct 16 of FIG. 6 is preferably connected to the suction fan inlet 402 to allow the suction fan to draw air at high velocity through the tangential inlet of the cyclone centrifugal separator 413. The separated dirt is discharged out tangential discharge 416 and drops into the container 414.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A vacuum cleaner, comprising:
   a handle; and
   a floor housing to which the handle is pivotally connected, wherein
   the floor housing further comprises:
      a suction fan motor;
      a suction fan driven by the suction fan motor and including a plurality of fan blades driven at a high velocity by the suction fan motor to suck a fluid from a first side of the fan to a second side of the fan;
   a pick up head positioned adjacent to a floor and in fluid communication with the suction fan; and
   a cyclonic separator device comprising:
      a cyclone chamber having a cylindrical shape with a predetermined diameter, the cyclone chamber further comprising:
         a tangential inlet duct positioned on a first longitudinal end of the cyclone chamber;
         an opening formed in an outer wall of the cyclone chamber at a second end of the cyclone chamber, opposite the inlet through which particles exit the cyclone chamber; and
         a center exit duct mounted substantially in the center of the cyclone chamber having an inlet opening positioned such the centrifuged fluid without particles flows into the center exit duct and out of the cyclone chamber, wherein
      the pick up head and suction fan are connected in fluid communication with the cyclone chamber such that fluid flows from the pick up head through the tangential inlet into the cyclone chamber and rotates therein at high velocity such that particles in the fluid are forced out to the inner surface of the outer wall of the cyclone chamber and are discharged through the opening.

2. The vacuum cleaner of claim 1, wherein the inlet of the center exit duct includes a sleeve including a plurality of perforations formed therein, such that the perforations prevent particles from entering the inlet.

3. The vacuum cleaner of claim 1, further comprising a jet assist duct connected between the center exit duct and the pick up head and a jet assist nozzle positioned on the pick up head and connected to the jet assist duct to provide a stream of high velocity air in a direction parallel to the floor to be cleaned to aid in sucking particles off the floor and into the pick up head.

4. The vacuum cleaner of claim 3 further comprising a collection chamber in fluid communication with the opening and structured to store separated particles from the fluid.

* * * * *